United States Patent
Gangadharan et al.

(10) Patent No.: US 7,325,871 B2
(45) Date of Patent: Feb. 5, 2008

(54) INFANT CAR SEAT

(75) Inventors: Shiva M. Gangadharan, West Chester, PA (US); Jason A. Carpenter, Reinholds, PA (US); Charles E. Crane, Coatesville, PA (US); Damaso A. Lamos, Reading, PA (US); Thomas M. Perrin, Thorndale, PA (US)

(73) Assignee: Graco Children's Products Inc., Exton, PA (US)

( * ) Notice: Subject to any disclaimer, the term of this patent is extended or adjusted under 35 U.S.C. 154(b) by 179 days.

(21) Appl. No.: 10/999,147

(22) Filed: Nov. 30, 2004

(65) Prior Publication Data

US 2005/0127727 A1 Jun. 16, 2005

Related U.S. Application Data

(60) Provisional application No. 60/561,530, filed on Apr. 13, 2004, provisional application No. 60/525,849, filed on Dec. 1, 2003.

(51) Int. Cl.
*B60N 2/26* (2006.01)
*A47D 1/00* (2006.01)

(52) U.S. Cl. .............. 297/256.16; 297/256.13
(58) Field of Classification Search ........... 297/256.13, 297/256.16, 250.1
See application file for complete search history.

(56) References Cited

U.S. PATENT DOCUMENTS

| | | | |
|---|---|---|---|
| 4,345,791 A | 8/1982 | Bryans et al. | |
| 4,634,177 A | 1/1987 | Meeker | |
| 4,754,999 A * | 7/1988 | Kain | 297/256.14 |
| 4,915,446 A | 4/1990 | Darling et al. | |
| 4,943,113 A | 7/1990 | Meeker | |
| 5,324,094 A | 6/1994 | Kain | |
| 5,335,964 A | 8/1994 | Sedlack et al. | |
| 5,385,387 A * | 1/1995 | Kain | 297/256.16 |
| 5,409,292 A | 4/1995 | Kain et al. | |
| 5,478,135 A | 12/1995 | Kain | |
| 5,516,190 A | 5/1996 | Kain et al. | |
| D372,149 S | 7/1996 | Cone, II et al. | |
| 5,540,365 A | 7/1996 | LaMair | |
| 5,544,935 A | 8/1996 | Cone, II et al. | |

(Continued)

FOREIGN PATENT DOCUMENTS

EP 0164909 A2 * 12/1985

(Continued)

*Primary Examiner*—Joe Edell
(74) *Attorney, Agent, or Firm*—Lempia Braidwood LLC

(57) ABSTRACT

An infant car seat includes a base including a belt path along which a vehicle belt can be secured to the base, and a carrier to detachably couple to the base. The carrier is positionable in a first, reclined position and a second, upright position. The belt path is fixed in location on the base such that the carrier can be positioned in either the first, reclined position or the second, upright position without adjustment of the vehicle belt relative to the base. This two-position infant carrier provides improved fit to child, The infant car seat also can include grips on the carrier of the infant car seat for improved carryability, grips on the base of the infant car seat for improved gripping of the vehicle seat and easier installation, and an adjustable height mechanism in the base for improved fit to vehicle seat.

19 Claims, 28 Drawing Sheets

U.S. PATENT DOCUMENTS

| | | | |
|---|---|---|---|
| 5,551,751 A | 9/1996 | Sedlack et al. | |
| 5,609,393 A * | 3/1997 | Meeker et al. | 297/256.13 |
| D379,888 S | 6/1997 | Cone, II et al. | |
| 5,746,478 A * | 5/1998 | Lumley et al. | 297/256.13 |
| 5,890,762 A * | 4/1999 | Yoshida | 297/256.13 |
| 5,947,556 A | 9/1999 | Strojny | |
| 5,971,476 A | 10/1999 | Gibson et al. | |
| 5,997,086 A | 12/1999 | Gibson et al. | |
| 6,017,088 A | 1/2000 | Stephens et al. | |
| 6,042,182 A | 3/2000 | Geis et al. | |
| 6,070,890 A * | 6/2000 | Haut et al. | 280/47.38 |
| 6,139,099 A | 10/2000 | Sköld et al. | |
| 6,139,100 A | 10/2000 | Baskin-Lockman et al. | |
| 6,296,307 B1 | 10/2001 | Holtke | |
| 6,318,799 B1 | 11/2001 | Greger et al. | |
| D451,312 S | 12/2001 | Kain | |
| D451,713 S | 12/2001 | Kain | |
| D451,714 S | 12/2001 | Cone, II | |
| 6,331,032 B1 | 12/2001 | Haut et al. | |
| 6,367,875 B1 | 4/2002 | Bapst | |
| 6,378,746 B1 | 4/2002 | Miller | |
| 6,378,937 B1 | 4/2002 | Faudman | |
| 6,386,639 B1 | 5/2002 | McMichael | |
| 6,428,100 B1 | 8/2002 | Kain et al. | |
| 6,431,646 B1 | 8/2002 | Longoria | |
| 6,454,350 B1 | 9/2002 | Celestina-Krevh et al. | |
| 6,513,208 B1 | 2/2003 | Sack et al. | |
| 6,550,862 B2 | 4/2003 | Kain | |
| 6,554,358 B2 | 4/2003 | Kain | |
| 6,561,577 B2 | 5/2003 | Kelly | |
| 6,588,839 B1 | 7/2003 | Salzer | |
| 6,588,849 B2 | 7/2003 | Glover et al. | |
| 6,592,180 B2 | 7/2003 | Combs | |
| 6,592,183 B2 | 7/2003 | Kain | |
| 6,626,489 B2 | 9/2003 | Geis et al. | |
| 6,715,828 B1 | 4/2004 | Cheng | |
| 2001/0004163 A1 | 6/2001 | Yamazaki | |
| 2003/0062746 A1 | 4/2003 | Takizawa | |
| 2003/0127894 A1 | 7/2003 | McNeff | |
| 2003/0127899 A1 | 7/2003 | Smith | |
| 2003/0151286 A1 | 8/2003 | Kain | |
| 2003/0164631 A1 | 9/2003 | Sedlack | |
| 2003/0164632 A1 | 9/2003 | Sedlack | |

FOREIGN PATENT DOCUMENTS

GB 2202433 A * 9/1988

* cited by examiner

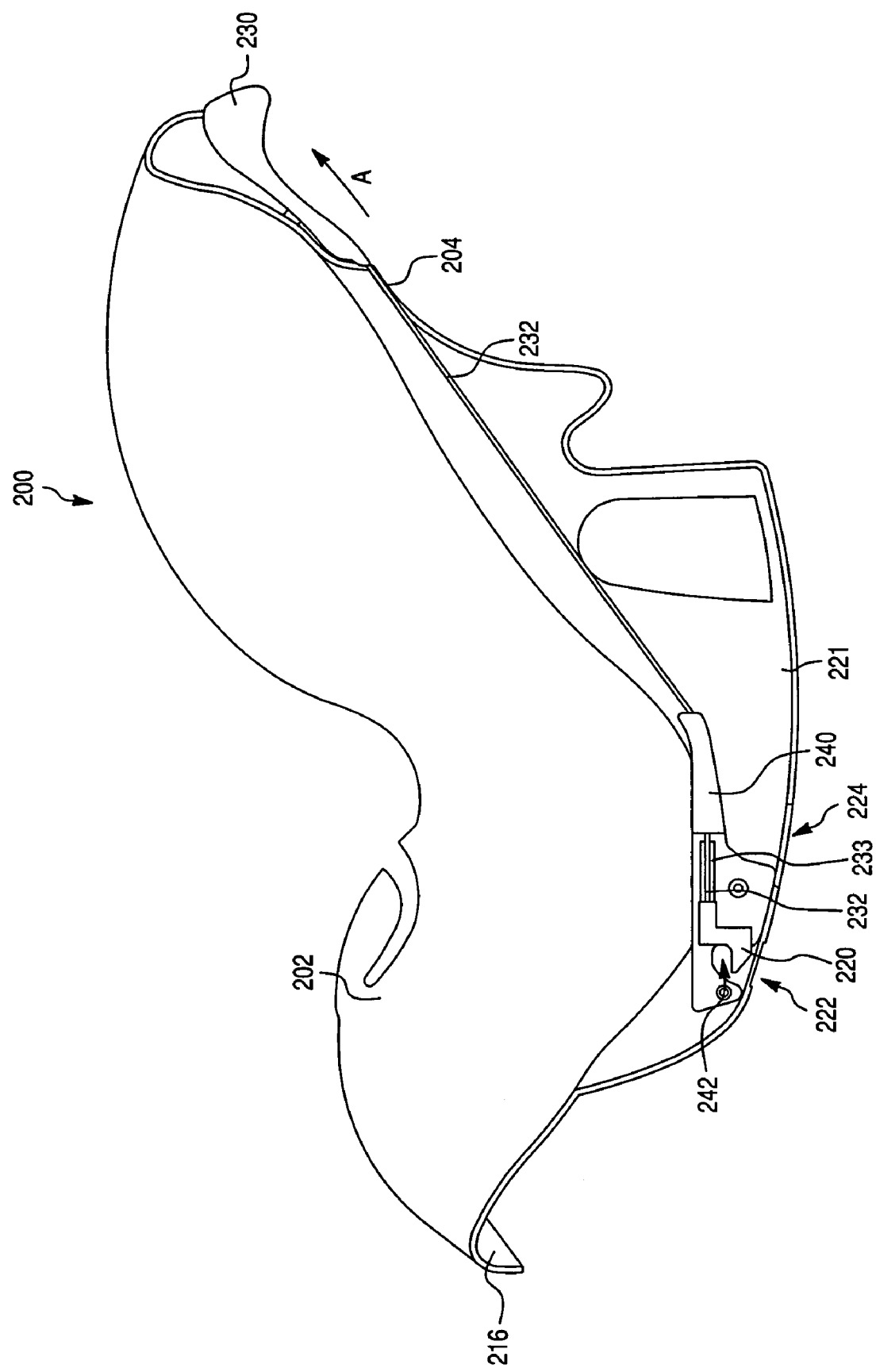

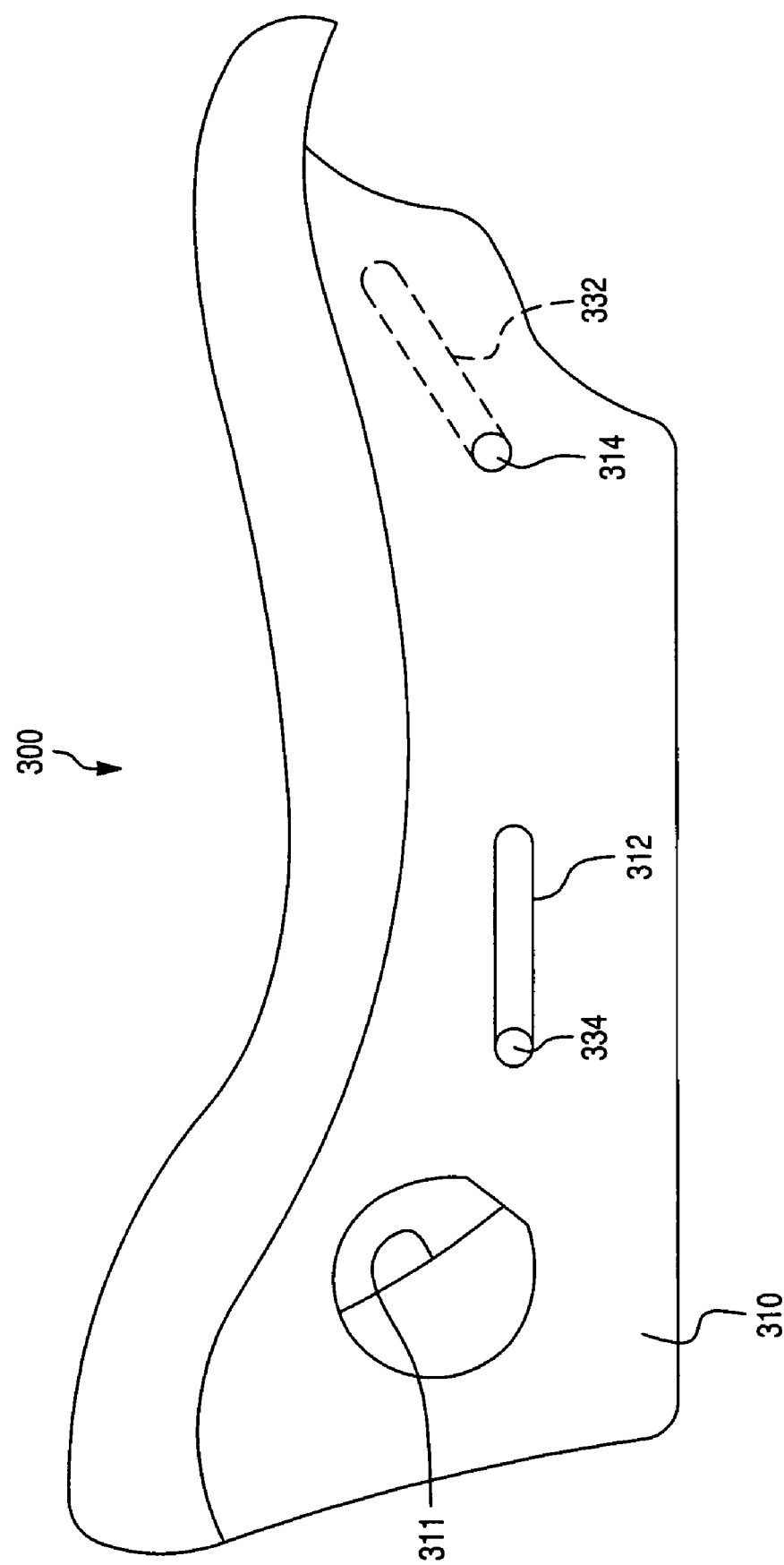

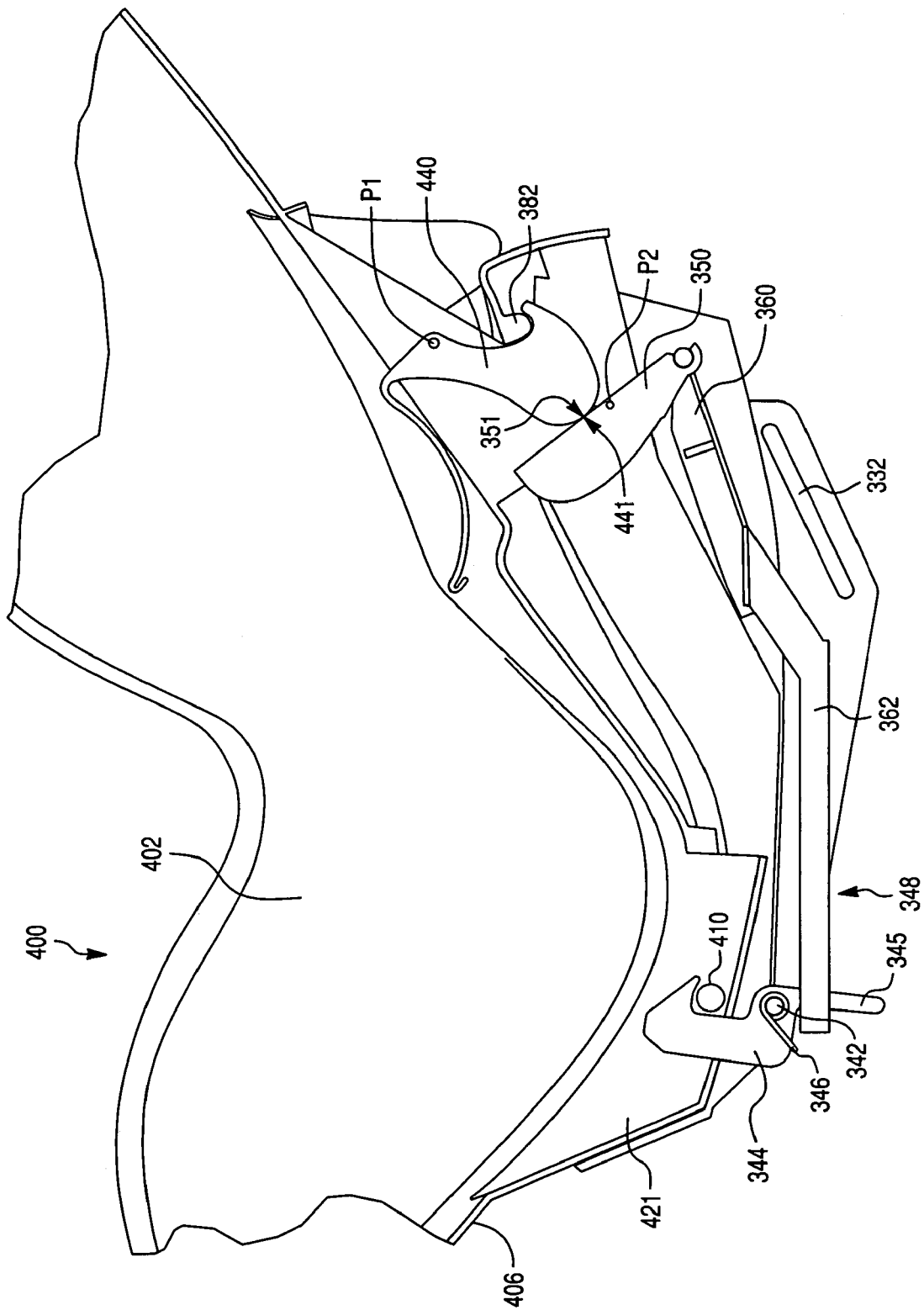

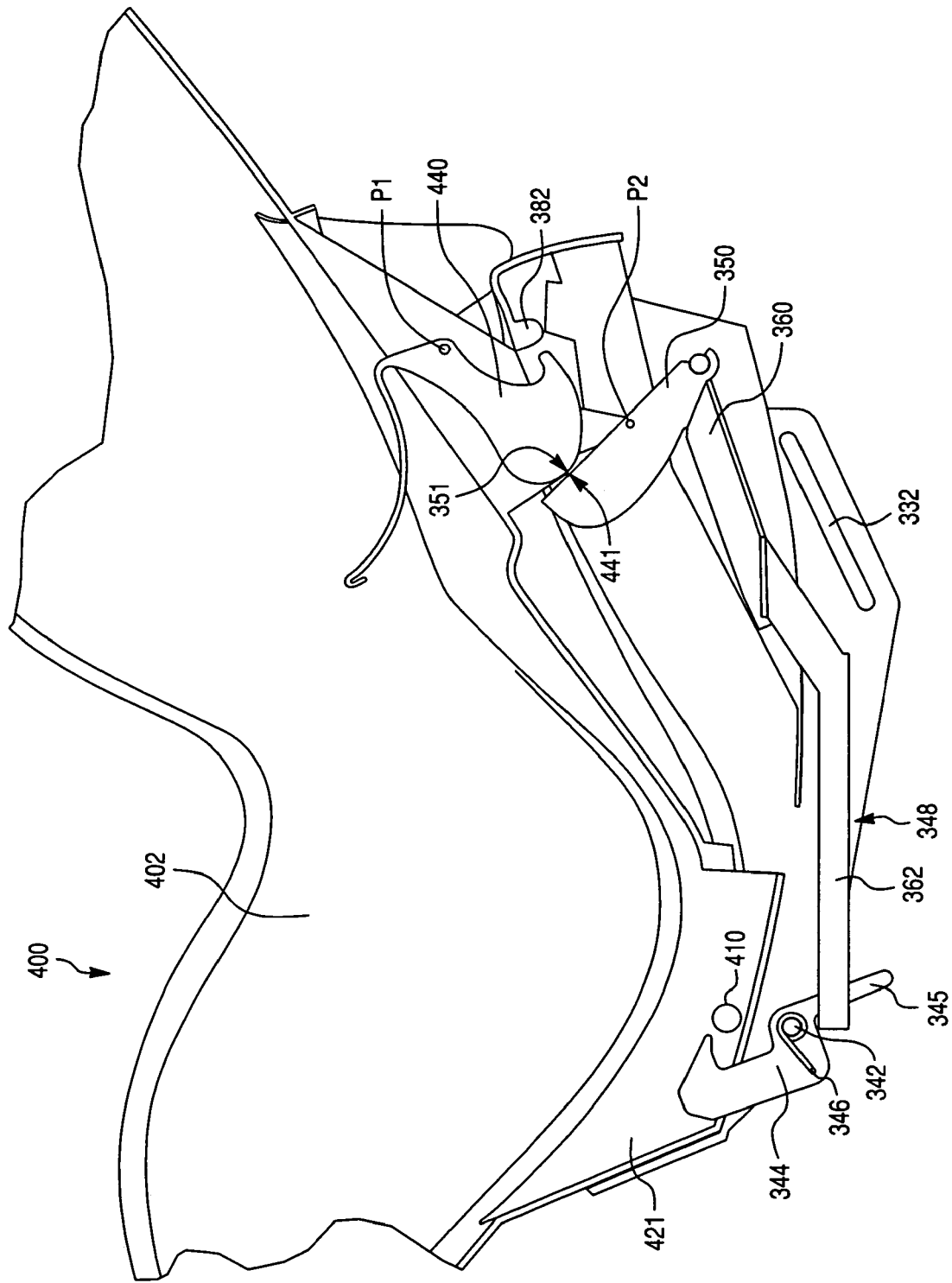

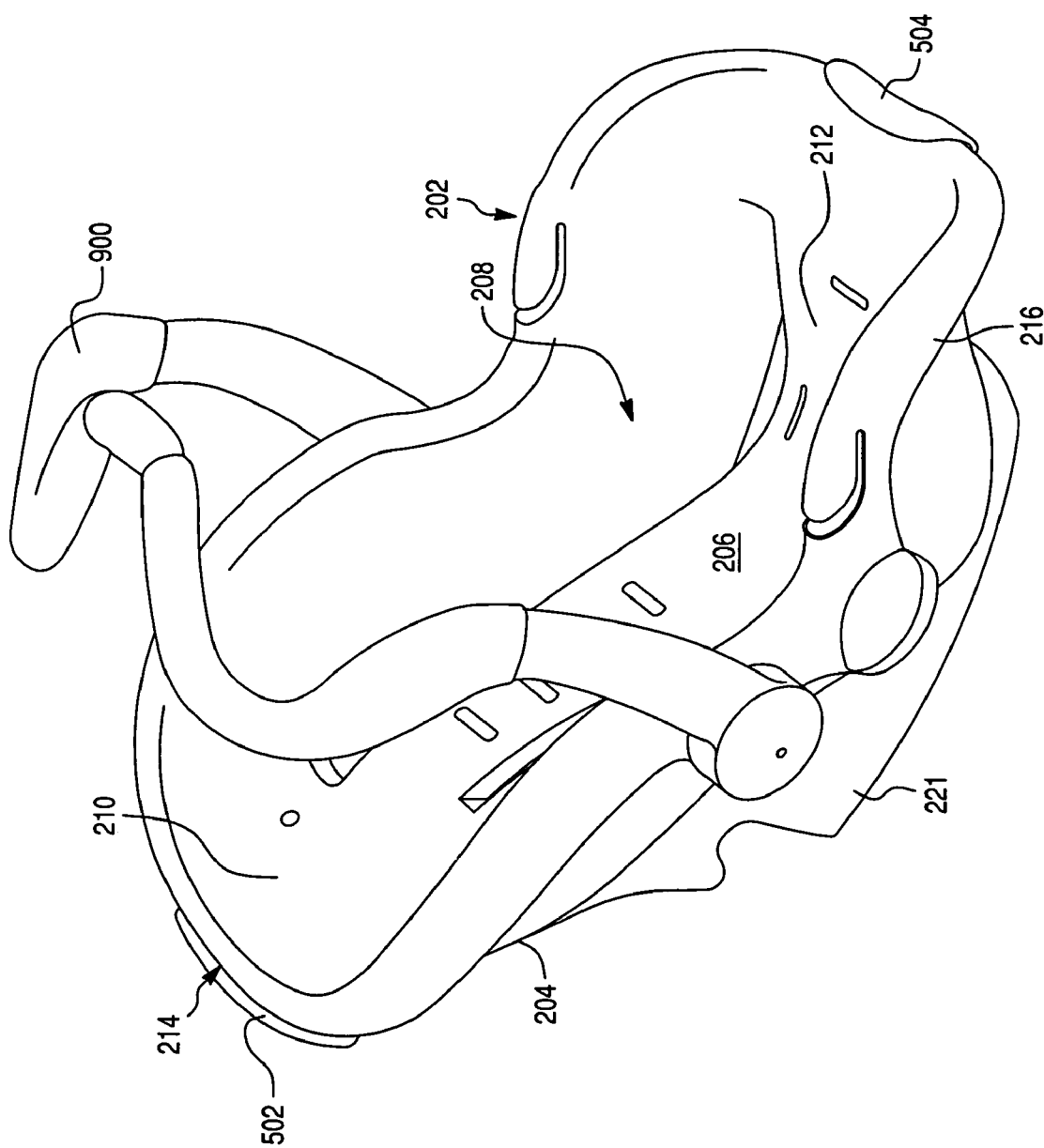

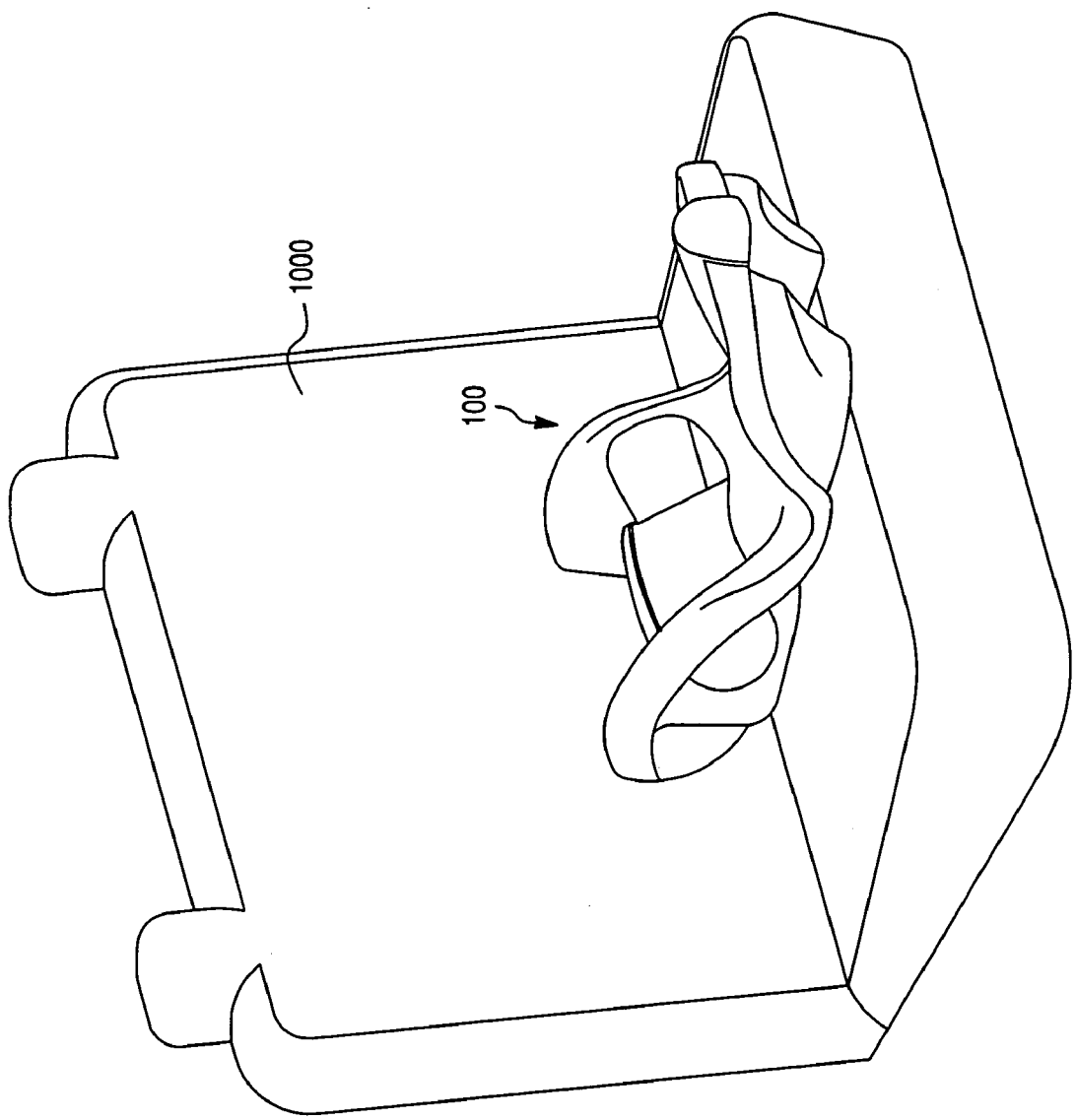

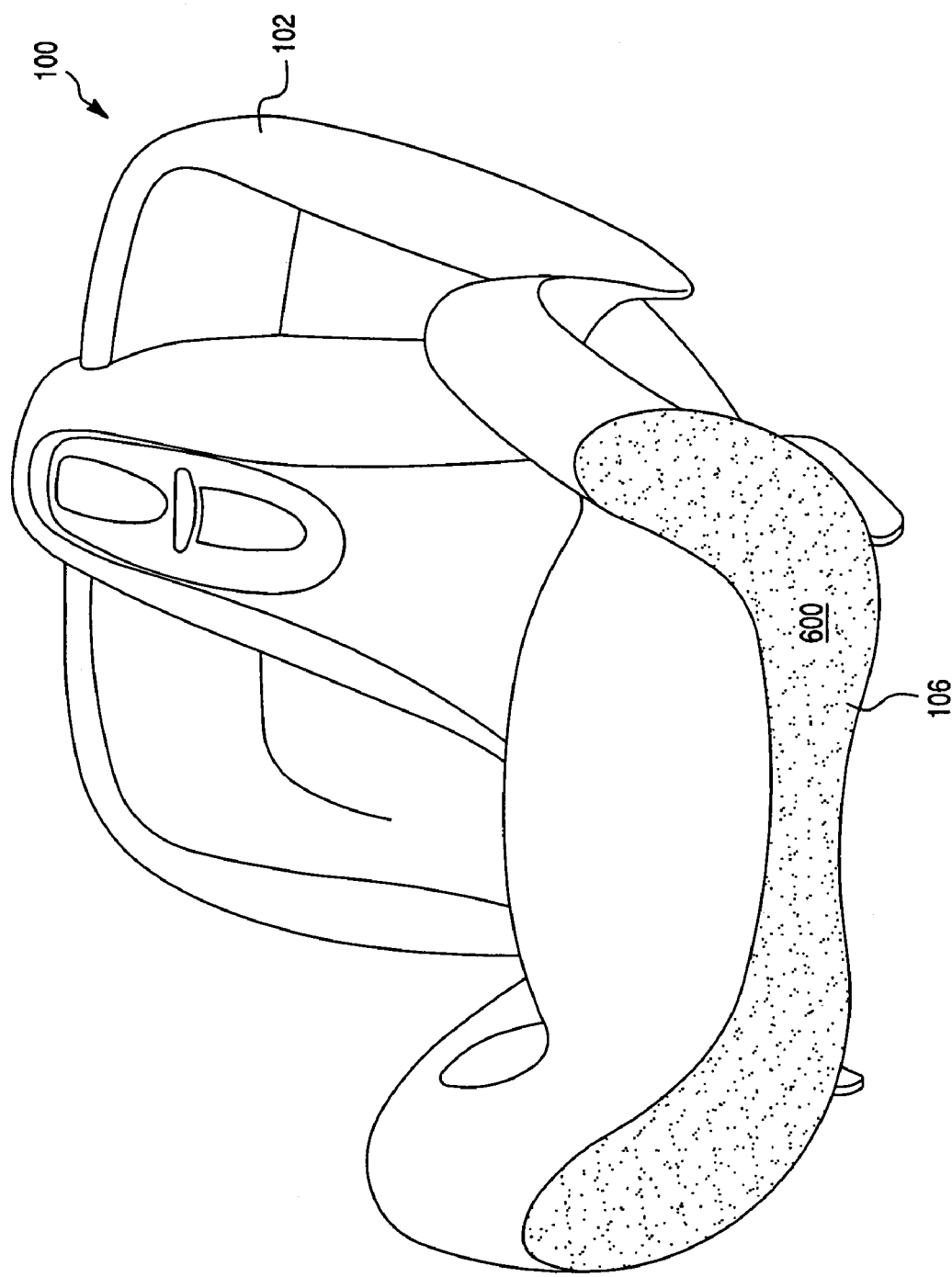

INFANT CAR SEAT

CROSS-REFERENCE TO RELATED APPLICATIONS

This application claims the benefit of U.S. Provisional Application No. 60/525,849, filed Dec. 1, 2003, and U.S. Provisional Application No. 60/561,530, filed Apr. 13, 2004, both of which are incorporated by reference in their entireties.

FIELD OF THE INVENTION

This invention relates to an infant car seat. More specifically, this invention relates to an infant car seat that can include a two-position infant carrier for improved fit to child, grips on the carrier of the infant car seat for improved carryability, grips on the base of the infant car seat for improved gripping of the vehicle seat and easier installation, and an adjustable height mechanism in the base for improved fit to vehicle seat.

BACKGROUND OF THE INVENTION

Rear-facing infant car seats generally include a base that can be secured to a vehicle seat and an infant carrier detachably coupled to the base. Currently available rear-facing infant car seats lack ample legroom for a growing infant; the growing infant's legs, all too quickly, contact the seat back of the vehicle seat. Parents see that the infant's leg movement is restricted by the vehicle seat back and perceive the space restriction as uncomfortable for the infant. In addition, a reclined rear-facing infant car seat that is particularly suited for a newborn may be uninteresting for a growing infant. A growing infant, lying reclined in an infant car seat, has limited ability to interact with his surroundings. Thus, there is a need for a rear-facing infant car seat that can function as a reclined infant car seat for a newborn, yet also accommodate the needs of a growing infant.

Infant carriers are designed to meet National Highway Traffic Safety Administration (NHTSA) safety and compliance tests. NHTSA standards require the infant carriers to be structurally sturdy and bulky to withstand a severe crash test pulse. The weight of the infant carrier, added to the weight of the growing infant, can make it difficult to carry the infant in the carrier. Today's parents and caregivers tend to be more mobile, keeping infants with them more often for longer periods of time. Carrying the combined weight of the infant and the carrier may fatigue the caregiver. Further, prolonged carrying may put more strain on the arms, shoulders, and lower back. Thus, there is a need for an infant car seat with a carrier that facilitates carrying of the carrier and that more effectively distributes the combined weight of the carrier and the infant across the caregiver's body.

Proper installation of the infant car seat base to the vehicle seat is important. In currently available infant car seats, the portion of the base that contacts the vehicle seat back is minimal. Thus, there is a need for an infant car seat with a base that can snugly grip the vehicle seat back.

In order to achieve a proper tight installation of the infant car seat to the vehicle seat, the caregiver has to apply force on the base of the car seat, while pulling on the vehicle seat belt. A tight installation can be best achieved when the caregiver rests his body weight on the base by placing his knee on the base. The bases of currently available infant car seats have a very uncomfortable upper surface, distorted with protrusions and buttresses. Placing a knee on such a surface and applying force can cause discomfort. Thus, there is a need for an infant car seat with a base that has a comfortable surface on which a caregiver can place his knee during installation.

Vehicle seats vary in form, design, finish, and foam or cushion content. Some vehicle seats are more bucketed than others. Some are flatter than others. Some have bolsters on the sides with the intent of offering a better fit to a passenger. Vehicle seat angle from ground level varies also among different manufacturers. This causes variation in the seat back angle of the carrier when the carrier is placed on the base. Some infant car seats have a height adjustment foot in the base, which can be adjusted by the caregiver to achieve a proper seat back angle. However, the range of foot travel may not be sufficient to fit certain bucketed vehicle seats. Thus, there is a need for an infant car seat with a base that can be easily adjusted to accommodate the varying configurations, dimensions, and materials of different vehicle seats.

SUMMARY OF THE INVENTION

An aspect of the present invention relates to an infant car seat that includes a base including a belt path along which a vehicle belt can be secured to the base; and a carrier to detachably couple to the base, the carrier being positionable in a first, reclined position and a second, upright position, wherein the belt path is fixed in location on the base such that the carrier can be positioned in either the first, reclined position or the second, upright position without adjustment of the vehicle belt relative to the base.

Another aspect of the invention relates to an infant car seat that includes a base, the base including first and second latch receivers corresponding to a first latching position and a second latching position, respectively; and a carrier to detachably couple to the base, the carrier including a latch for releasable engagement with the first and second latch receivers to position the carrier in the first latching position and in the second latching position, respectively, wherein the base includes a belt path along which a vehicle belt can be secured to the base, the belt path being fixed in location on the base such that the carrier can be moved between the first latching position and the second latching position without adjustment of the vehicle belt relative to the base.

Another aspect of the invention relates to an infant car seat that includes a base assembly including a fixed base portion and a movable base portion that is movably mounted to the fixed base portion, the movable base portion being movable between a first position and a second position; and a carrier to detachably couple to the base assembly. wherein the fixed base portion includes a belt path along which a vehicle belt can be secured to the base assembly, such that the movable base portion can be moved between the first position and the second position without adjustment of the vehicle belt relative to the fixed base portion.

Another aspect of the invention relates to an infant carrier that includes a seat shell including an upper surface, a lower surface, and a perimeter defining an outer boundary of the upper surface, the seat shell being made of a seat shell material; and at least one grip coupled to the perimeter of the seat shell, the grip being made of a grip material that is more compressible than the seat shell material.

Another aspect of the invention relates to an infant carrier that includes a seat shell, the seat shell having an outer rim at least partially encircling the infant seating area, the seat shell being made of a seat shell material; and at least one grip coupled to the outer rim of the seat shell, the grip being made of a grip material that is more compressible than the seat shell material.

Another aspect of the invention relates to a base of an infant car seat that includes a shell having a rear wall, the rear wall having an outer surface, the shell being made of a material with a first coefficient of friction; and a gripping material on at least a portion of the outer surface of the shell rear wall, the gripping material having a second coefficient of friction greater than the first coefficient of friction.

A base of an infant car seat that includes a shell including an upper surface to receive an infant carrier, a first sidewall, and a second sidewall, the shell being made of a shell material; and a knee grip on the upper surface of the shell between the first and second sidewalls, wherein the knee grip is made of a grip material that is more compressible than the shell material.

A base of an infant car seat that includes a shell including a height adjustable end; and a height adjustment mechanism including a foot disposed proximate to the height adjustment end of the base, the foot having a threaded opening, a threaded shaft rotatably coupled to and engaging the threaded opening of the foot, the threaded shaft having a first end, and a knob coupled to the first end of the shaft in a linear arrangement and to the height adjustment end of the base such that a user can grip and rotate the knob to cause the threaded shaft to rotate and to translate relative to the threaded opening of the foot, thereby adjusting the foot relative to the base.

Another aspect of the invention relates to a base of an infant car seat that includes a shell including a height adjustable end; and a height adjustment mechanism including, a foot disposed proximate to the height adjustment end of the base, the foot having a threaded opening, a threaded shaft rotatably coupled to and engaging the threaded opening of the foot, the threaded shaft having a first end, and an actuator coupled to the first end of the shaft in a linear arrangement and to the height adjustment end of the base such that a user can grip and rotate the actuator to cause the threaded shaft to rotate and to translate relative to the threaded opening of the foot, thereby adjusting the foot relative to the base.

According to another aspect of the invention, a method of assembling a height adjustment mechanism to a base of an infant car seat includes providing a shell including a height adjustable end to place in juxtaposition with a seat back of a vehicle seat; coupling a threaded shaft to a threaded opening of a foot such that the shaft can rotate relative to the foot; placing the foot and the shaft beneath and proximate to the height adjustment end of the base; aligning the shaft with an aperture through an upper surface of the base; and placing a manual actuator through the opening and into engagement with the threaded shaft in a linear arrangement such that user can grip and rotate the knob to cause the threaded shaft to rotate and to translate relative to the threaded opening of the foot, thereby adjusting the foot relative to the base.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 3B is a partial cut-away, side view of the carrier of FIG. 3A, illustrating the latch of the carrier.

FIG. 6C is a side view of the base assembly of FIG. 6A, in which the movable base is in a first position.

FIG. 8B is a partial cut-away, side view of a carrier coupled to the base assembly of FIG. 6A, in which the carrier is latched to the movable base.

FIG. 8C is a partial cut-away, side view of the carrier and base assembly of FIG. 8A, in which the carrier is unlatched from the movable base.

FIG. 9 is a top perspective view of a carrier that includes grips to facilitate carrying of the carrier.

FIG. 10 is a top perspective view of a base positioned on a vehicle seat.

FIG. 11 is a top perspective view of the base of FIG. 10, in which the base includes a grip for maximizing friction between the base and the vehicle seat.

DETAILED DESCRIPTION OF THE PREFERRED EMBODIMENTS

Reference will now be made in detail to presently preferred embodiments of the invention, examples of which are illustrated in the accompanying drawings. An effort has been made to use the same reference numbers throughout the drawings to refer to the same or like parts.

Figure 1:
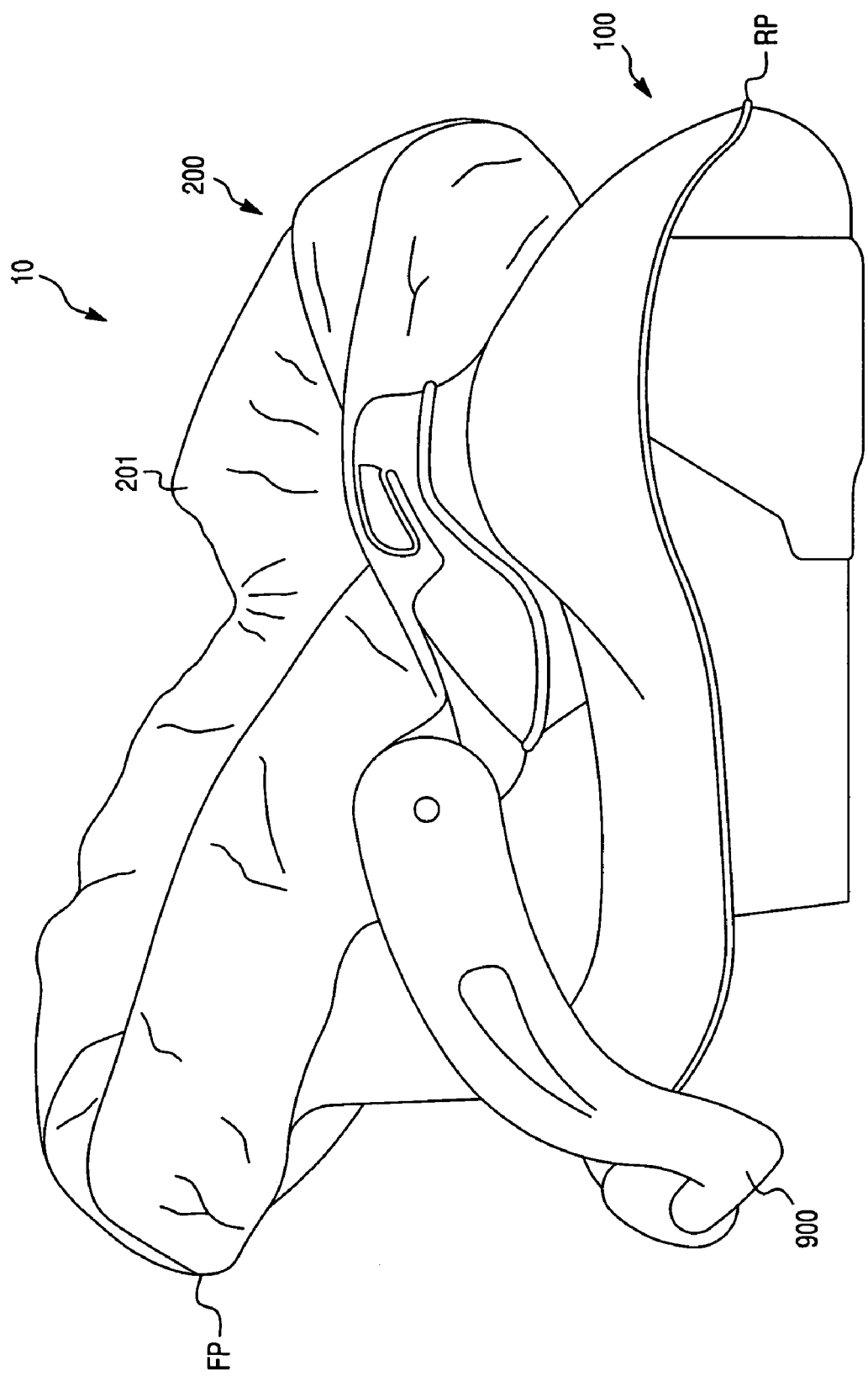
FIG. 1 is a side view of an infant car seat in accordance with the invention.

FIG. 1 illustrates a rearwardly-facing infant car seat 10 according to an exemplary embodiment of the invention. The infant car seat 10 includes a base 100 to secure to a vehicle seat and a carrier 200 to detachably couple to the base 100. The carrier 200 can be latched to the base 100 in two positions, such that, in a first latching position, the carrier 200 can function as a reclined infant car seat for a newborn, and, in a second, more upright latching position, the carrier 200 can accommodate the space needs of a growing infant. FIG. 1 shows the carrier in the first, reclined latching position.

Figure 5:
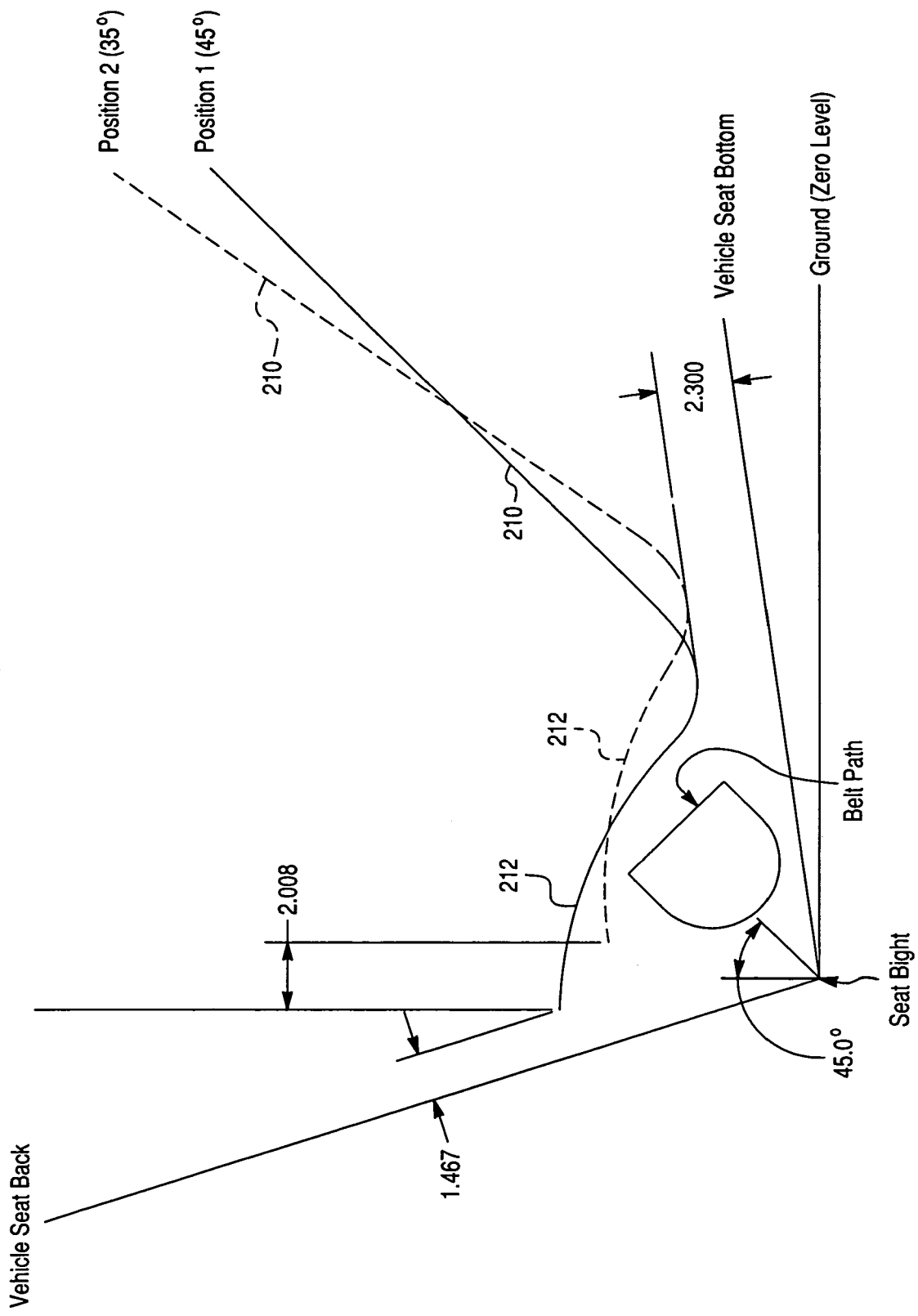
FIG. 5 is a graphical representation of the carrier orientation relative to a vehicle seat in a first position and in a second position.

FIG. 5 illustrates, in graphical form, the angle of the seat back 210 and seat bottom 212 of the carrier in its two latching positions relative to a vehicle seat. FIG. 5 identifies the seat back of the vehicle seat, the seat bottom of the vehicle seat, and the seat bight at the intersection of the seat back and the seat bottom. FIG. 5 also identifies the belt path of the base 100 (also seen as belt path 150 in FIG. 2) across which the vehicle seat belt may pass to secure the base 100 to the vehicle seat. In an embodiment, as shown in FIG. 5, the distance between the vehicle seat back and the rearmost edge of the carrier 200 can be about 1.467 inches; the distance between the rearmost edge of the carrier 200 in the first position and in the second position can be about 2.008 inches; and the distance between the lowermost point of the carrier 200 and the vehicle seat bottom can be about 2.300 inches.

When the carrier is positioned in the first of the two latching positions, appropriate for a newborn, the seat back 210 of the carrier 200 is at an angle of 45° from vertical, where vertical is defined in the vertical plane through the seat bight at the intersection of the vehicle seat back and the vehicle seat bottom. In the second latching position, more appropriate for an older infant with developed neck and shoulder muscles and increased head control, the carrier 200 is rotated upwardly 10° to move the seat back 210 to an angle of 35° from vertical, again where vertical is defined in the vertical plane through the seat bight at the intersection of the vehicle seat back and the vehicle seat bottom. In this second latching position, the growing infant can sit more upright relative to the first latching position and can interact more with the surrounding environment.

Figure 17:
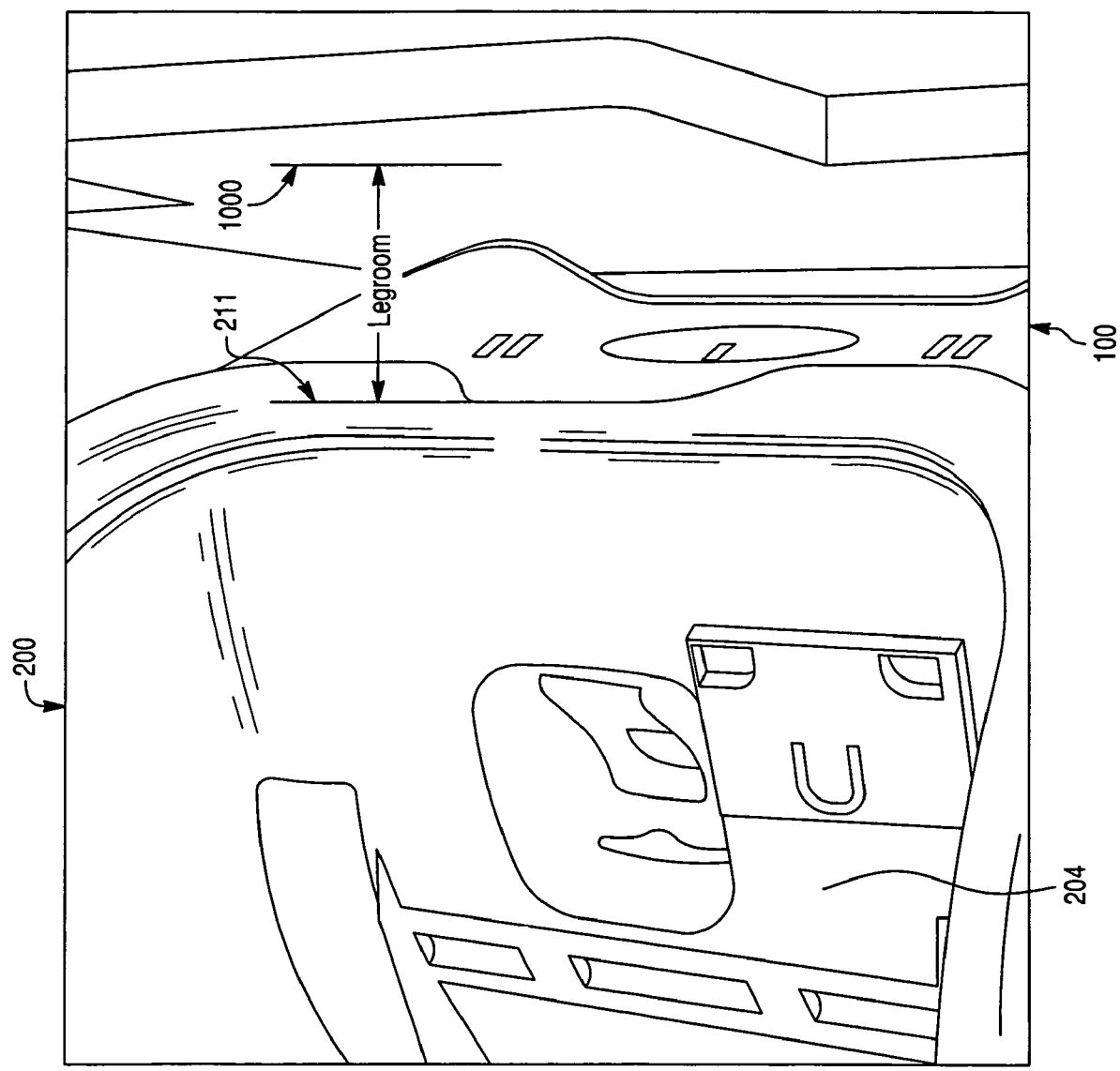
FIG. 17 is a top perspective, detail view of the infant car seat that illustrates the legroom measurement of the infant car seat.

Child anthropometric data suggests that a $95^{th}$ percentile 1 year old ideally needs an additional three inches of legroom relative to a newborn. FIG. 17 illustrates how a legroom measurement of the infant car seat 10 can be taken. The legroom measurement refers to the distance from an upper rear edge 211 of the carrier 200 to a seat back 1000 of the vehicle seat along a horizontal plane. When the carrier 200 of the infant car seat 10 is rotated to the second latching position, the infant car seat 10 can provide up to 3.5 inches of legroom for the infant, or, in another embodiment, up to 2.875 inches of legroom for the infant. For example, in one embodiment, the available legroom ranges from about 1.0 inches of available legroom in the first, reclined latching position to up to about 3.5 inches of available legroom in the second latching position. In another embodiment, the available legroom ranges from about 1.75 inches of available legroom in the first, reclined latching position to up to about 2.875 inches of available legroom in the second latching position. The available legroom of the infant car seat 10 thus can be greater than 2 inches in the second latching position. Accordingly, the infant car seat 10 can accommodate a fairly large infant.

Further, referring to FIG. 1, the infant car seat 10 can have essentially the same overall length in the first latching position and in the second latching position, as measured from the foremost point FP of the infant car seat 10 to the rearmost point RP of the infant car seat 10. The infant car seat 10 has essentially the same overall length in the two latching positions because the rearmost point RP on the base 100 remains the same between the first and second latching positions, and the foremost point FP, which is at the foremost point of the carrier 200, changes only in a vertical direction (see FIG. 5) and not in a front-to-back direction. Hence, the infant car seat 10 can comfortably fit a child through growth from a newborn to a large infant, yet does not require additional space inside the vehicle during the child's growth.

The structure of the base 100 and the detachable and repositionable carrier 200 now will be described.

Figure 2:
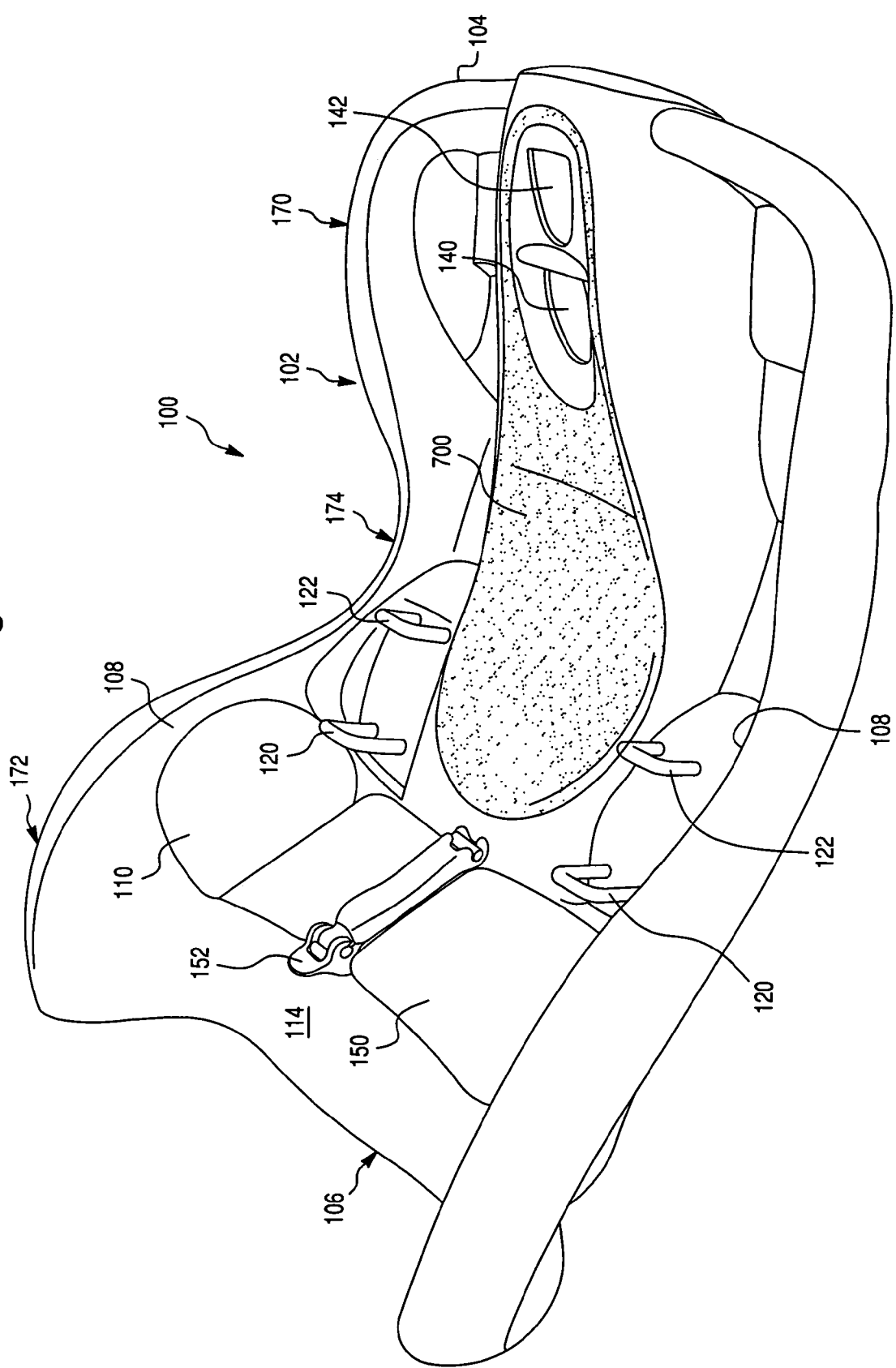
FIG. 2 is a top perspective view of an exemplary base of the infant car seat.

Referring to FIG. 2, the base 100 can comprise a molded shell 102 that has sidewalls including a front wall 104, a rear wall 106, and opposing sidewalls 108. Each of the opposing sidewalls 108 includes a belt aperture 110 to allow passage of the vehicle seat belt. A belt path 150 extends across an upper surface 114 of the base 100, between the belt apertures 110, along which the vehicle belt can pass to secure the base 100 to the vehicle. Because the belt path 150 is associated with the base 100, not the carrier 200, and remains fixed in location on the base 100, the carrier 200 can be moved between the first latching position and the second latching position without requiring adjustment of the vehicle belt. Additionally, the belt path 150 can include a lock-off mechanism 152 to lock the vehicle belt to the base 100. Suitable lock-off mechanisms 152 are described in copending U.S. application Ser. No. 10/999,144, entitled LOCK-OFF MECHANISM FOR CHILD SEAT, filed Nov. 30, 2004, which is incorporated by reference in its entirety. The lock-off mechanism 152 can be connected directly to the seat shell 102 or it can be formed as part of a larger molded assembly (such as an integrally molded lock-off mechanism and belt path cover) that is otherwise secured to the belt path 150 of the shell 102.

The base 100 further includes first and second latch receivers that correspond to the first reclined, latching position and the second upright, latching position, respectively. In the illustrated embodiment, the first latch receiver comprises a first pair of U-shaped latching bars 120 that are fixed to opposite sides of the upper surface 114 of the base shell 102, and the second latch receiver comprises a second pair of U-shaped latching bars 122 fixed to opposite sides of the upper surface 114 of the base shell 102. The carrier 200 can be coupled to either of the pairs of latching bars 120, 122. Latching bars 120 can fix the carrier 200 in the first position at a 45° angle from vertical, and latching bars 122 can fix the carrier in the second position at a 35° angle from vertical. Latching bars 120 are closer to the rear wall 106 of the base shell than latching bars 122.

Figure 3A:
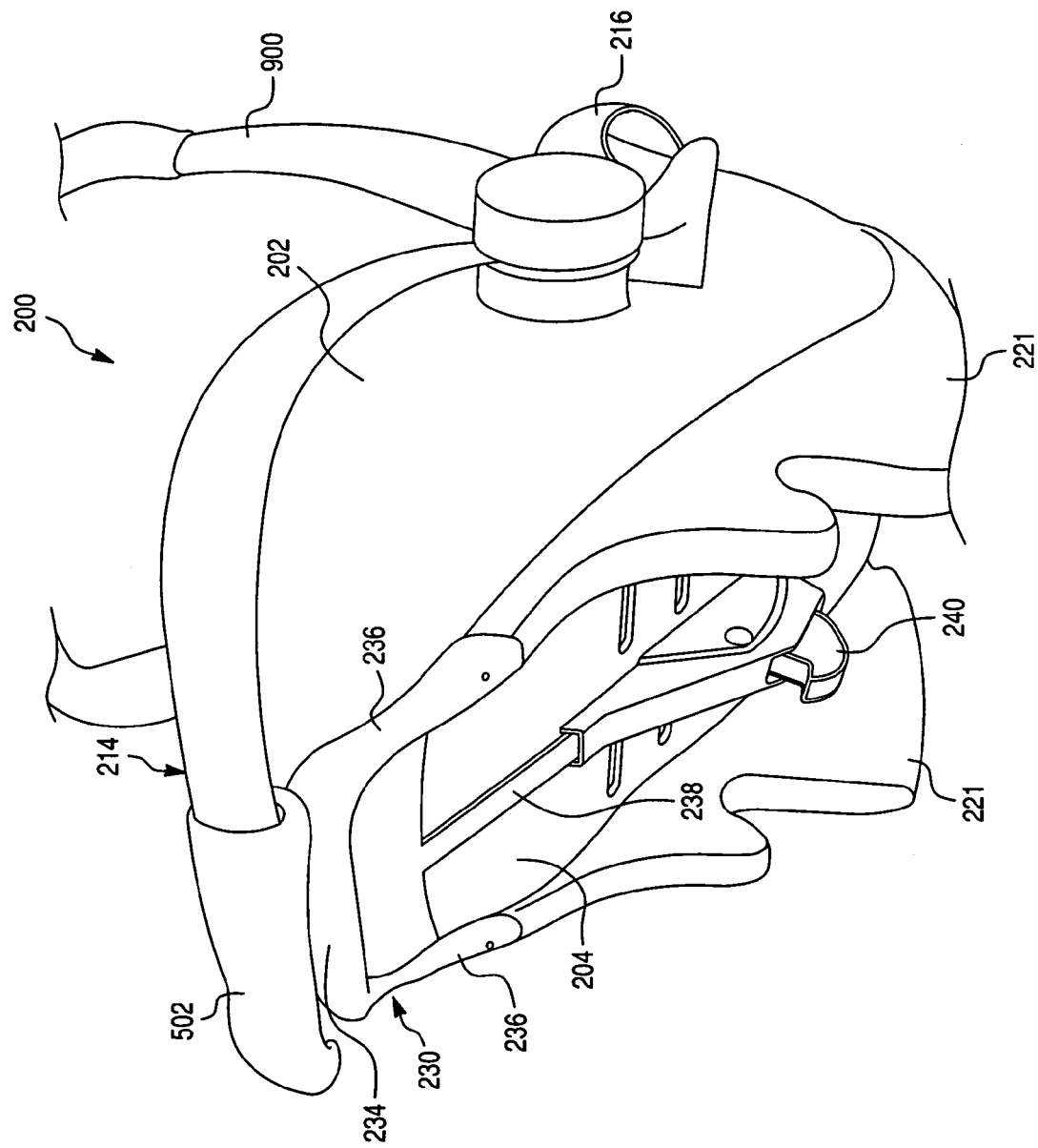
FIG. 3A is a perspective view of a carrier of the infant car seat suitable for use with the base of FIG. 2.

FIGS. 3A, 3B, and 9 illustrate an exemplary carrier 200 to be secured to the base 100. The carrier 200 generally includes a molded shell 202 that has a lower surface 204 for securement to the base 200 and an upper surface 206 that defines an infant seating area 208. The upper surface 206 of the seat shell 202 has a seat back 210 and a seat bottom 212. A perimeter, generally indicated 214 in FIG. 9, defines the outer boundary of the upper surface 204 of the seat shell 202.

The seat shell 202 also has an outer rim 216, as best seen in FIG. 3A, that at least partially encircles the infant seating area 208.

The carrier 200 also can include first and second latches 220 on opposite sides of the seat shell 202 for releasable engagement with the first latching bars 120 and the second latching bars 122 to position the carrier 200 in the first latching position and the second latching position, respectively. The structure and operation of the latches 220 will be described in connection with FIGS. 3A, 4A, and 4B, which illustrate only one of the latches 220 on one side of the seat shell 202; it will be understood that the latch 220 on the opposite side of the seat shell 202 is structured and operates the same as the one shown in FIGS. 3A, 4A, and 4B.

Figure 4A:
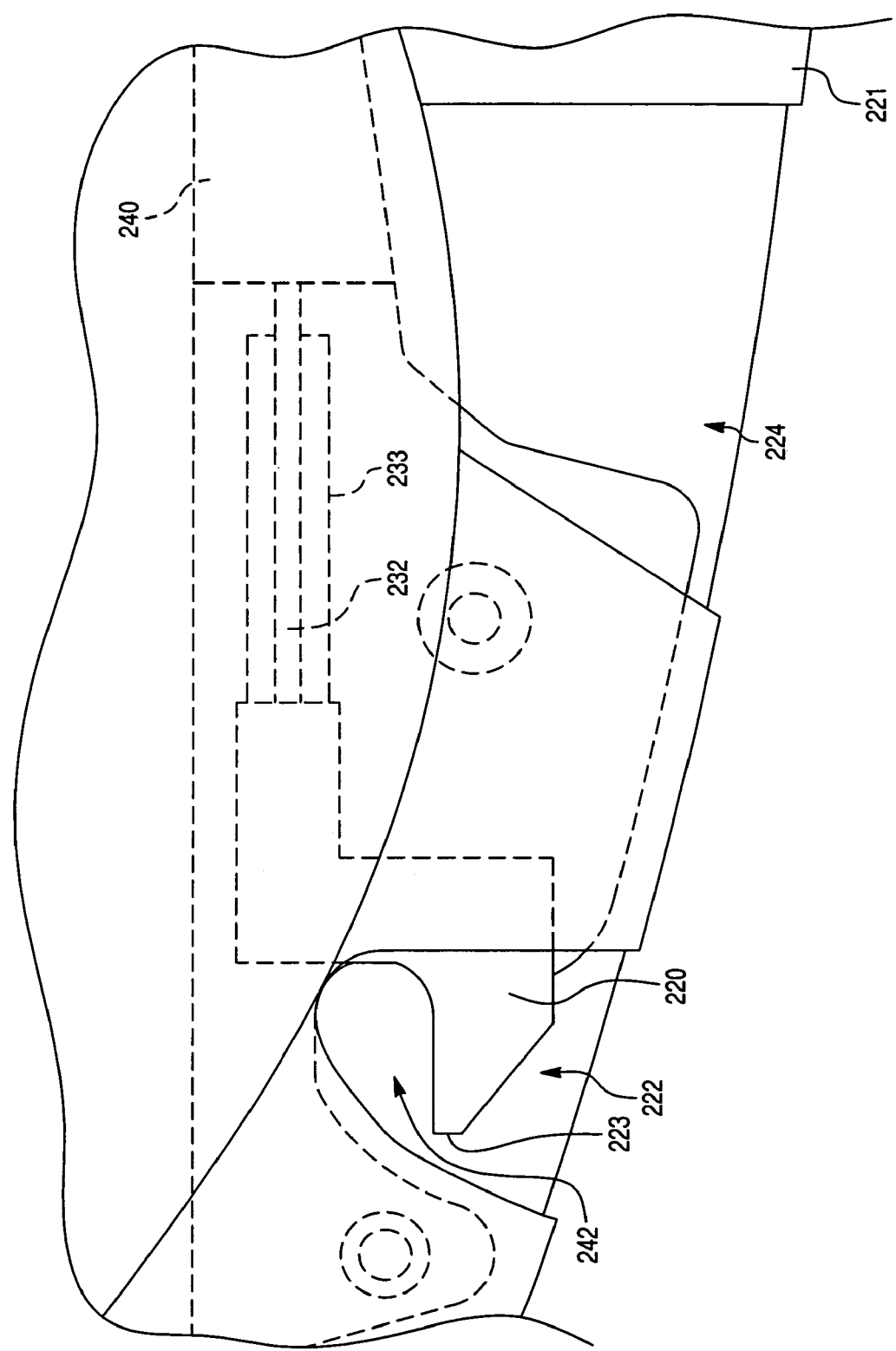
FIG. 4A is an enlarged, detail view of a latch of the carrier of FIG. 3A, illustrating the latch in a closed, latched position.
Figure 4B:
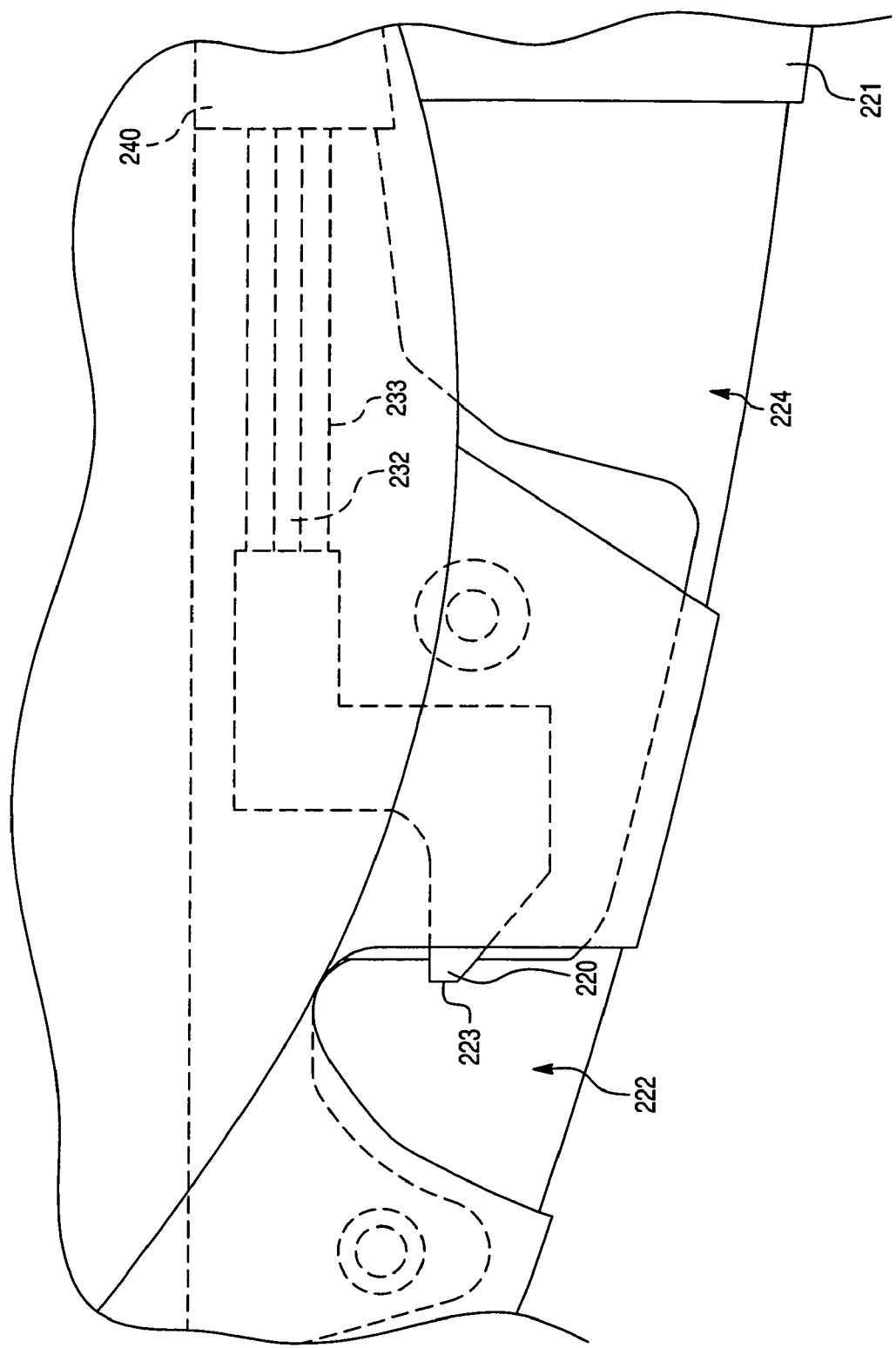
FIG. 4B is an enlarged, detail view of a latch of the carrier of FIG. 3A, illustrating the latch in an open, unlatched position.

The latches 220 are housed in respective curved supports 221 on either side of the lower surface 204 of the carrier shell 202. Each curved support 221 includes a first recess 222 and a second recess 224. The latch 220 can move into and out of the first recess 222 between a latched position and an unlatched position, as shown in FIGS. 4A and 4B, respectively. That is, the latch 220 can slide linearly into and out of the respective first recess 222. The second recess 224 in the curved support 221 is positioned to receive the respective second latching bar 122 of the base 100 when the carrier shell 202 is coupled to the first latching bars 120 in the first reclined position.

Figure 18:
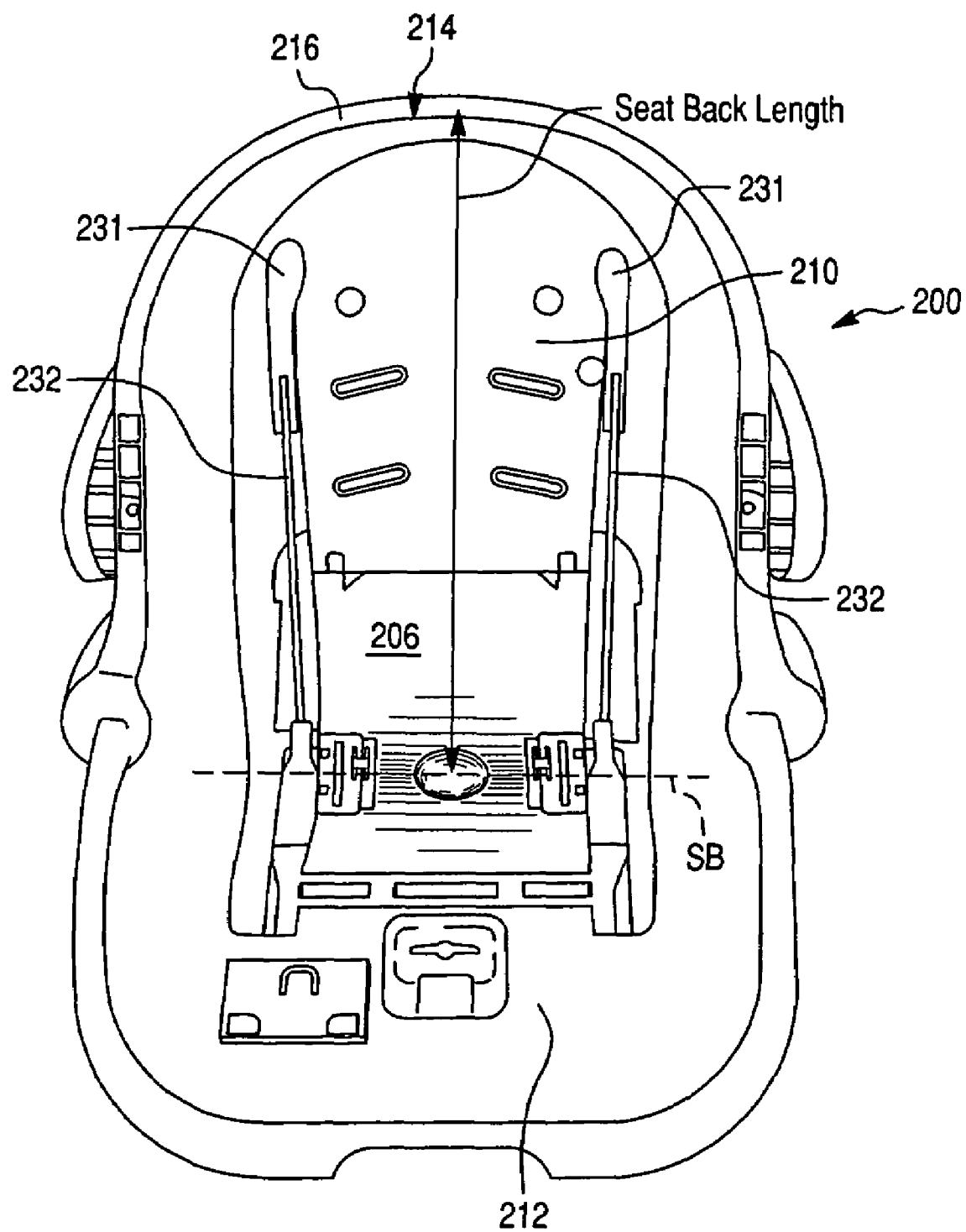
FIG. 18 is a front elevation view of a carrier that illustrates the seat back length measurement of the carrier.

To actuate the first and second latches 220, the carrier 200 includes a release handle 230, as shown in FIG. 3A. The release handle 230 can be coupled to the latches 220 by first and second connecting rods 232 (see FIG. 18), respectively. The release handle 230 is slidably mounted to the lower surface 204 of the carrier shell 202, opposite the back rest 210. The release handle 230 remains accessible to a caregiver when the carrier 200 is coupled to the base 100. The release handle 230 has a central section 234 with a grip detail and two arms 236 that extend along the lower surface 204 in the direction of the curved supports 221. The connecting rods 232 fit within channels on the upper surface 206 of the carrier shell 202. A first end of each connecting rod 232 connects to a respective handle arm 234, as shown in FIG. 18, and a second end of each connecting rod 232 extends through a latch housing 240 and connects to the respective latch 220, as shown in FIG. 3B. The latches 220 each have a hooked end 223 that cooperates with the respective recess 222 to encircle a selected latching bar 120, 122 in latch pocket 242. As can be understood from FIG. 3B, when the release handle 230 is actuated (moved in the direction of arrow A), the connecting rods 232 slide the latches 220 from the closed, latched position of FIG. 4A to the open, unlatched position of FIG. 4B. The carrier 200 then can be repositioned from one latching position to the other latching position. When the release handle 230 is released, the latches 220 resume their closed, latched position. The latches 220 can be biased in the closed, latched position by springs 233.

Although the illustrated embodiment contemplates only first and second latching positions, it will be understood that the base of the infant car seat can be equipped with more than two latching positions.

In addition to the latching bars 120, 122, the base 100 can include a pair of receptacles 140, 142 corresponding to the first and second latching positions, respectively, as shown in FIG. 2. Further, as shown in FIG. 3A, the carrier 200 can include a hook 240 to engage the receptacles 140, 142. Thus, when the carrier 200 is coupled to the base 100 in the first latching position, latches 220 engage latching bars 120, and the hook 240 engages receptacle 140. When the carrier 200 is coupled to the base 100 in the second latching position, latches 220 engage latching bars 122, and the hook 240 engages receptacle 142. The hook 240 can be pivotally coupled to the seat shell 202 and connected to a central arm 238 of the handle 230 so that, when the handle 230 is moved in the direction A in FIG. 3B, the hook 240 can rotate away from and disengage from the respective receptacle 140, 142.

Figure 2A:
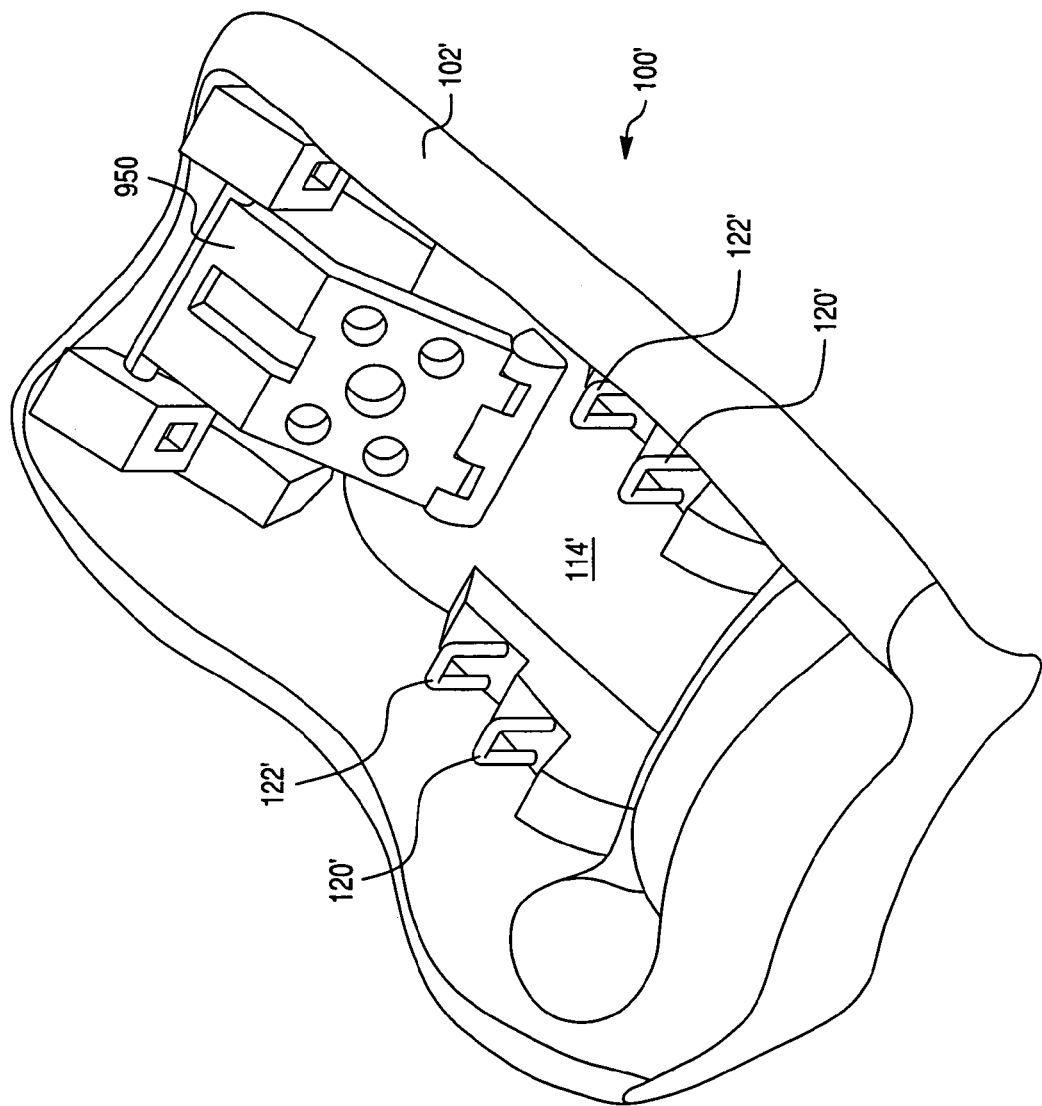
FIG. 2A is a top perspective view of another exemplary base of the infant car seat.
Figure 2B:
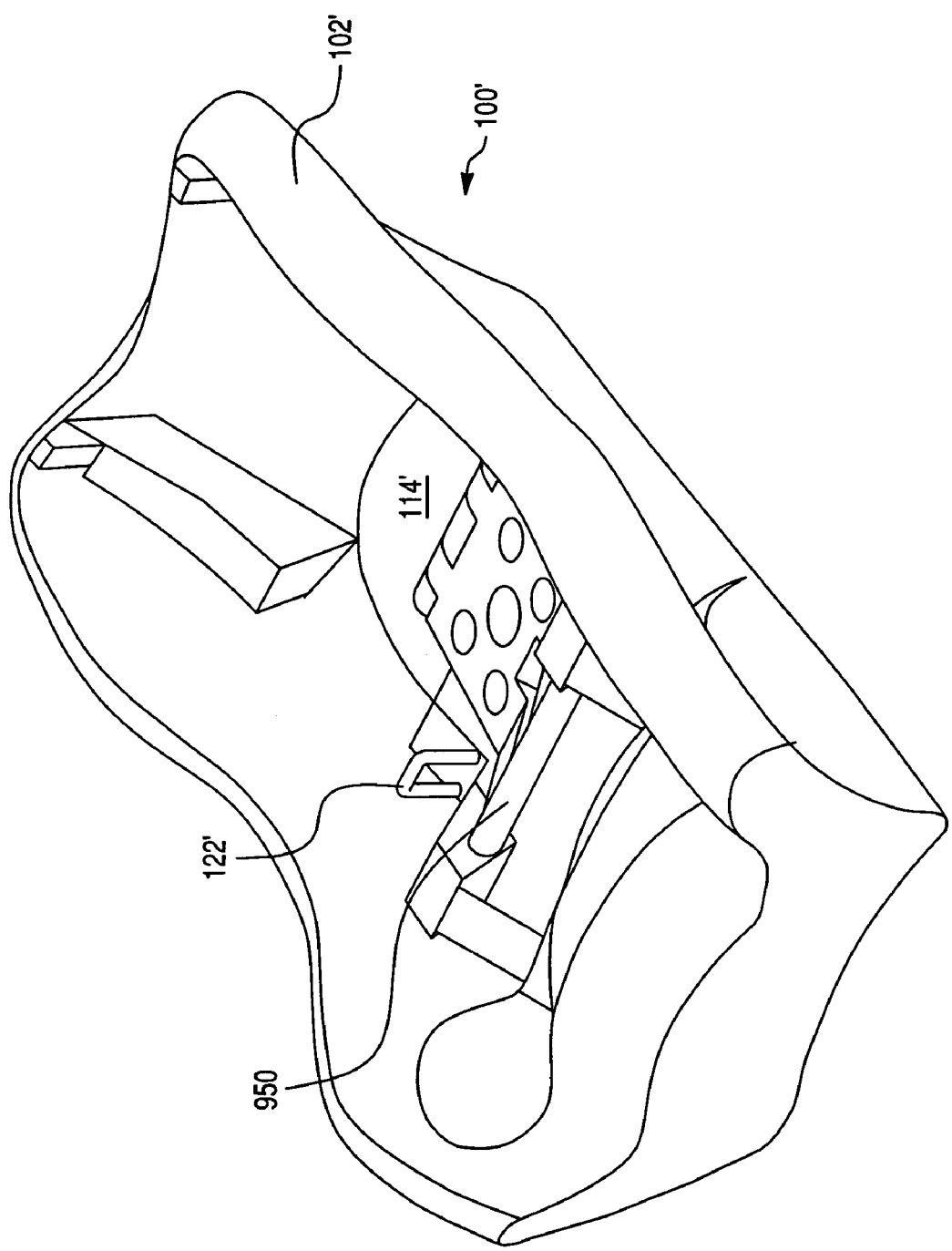
FIG. 2B is a top perspective view of the base of FIG. 2A.

To simplify latching between the first and second latching positions, the base can include a user interface, such as a cover, designed so that only one pair of latching bars 120, 122 is exposed at a given time. For example, FIG. 2A illustrates an embodiment of a base 100' that includes a cover 950 to cover the first latch receivers 120' when not in use. The cover 950 can be pivotally attached to an upper surface 114' of the base shell 102'. When a carrier is to be coupled to the base 100' in the second position, the cover 950 can be pivoted from its orientation in FIG. 2A to its orientation in FIG. 2B so that latching bars 120' are covered. Another example of such a user interface can comprise a sliding cover per side of the base 100 that slides between and over the respective first and second latching bars 120, 122 so that, at any given time, either the first or the second latching bar 120, 122 is covered. Another example of such a user interface can comprise a cover per side of the base 100 that can flip between and over the respective first and second latching bars 120, 122 so that, at any given time, either the first or the second latching bar 120, 122 is covered. Another example of such a user interface can comprise a swivel plate per side of the base 100 that can swivel between and over the respective first and second latching bars 120, 122 so that, at any given time, either the first or the second latching bar 120, 122 is covered. Other swivel mechanisms can be conceived that swivel or rotate along different axes and planes to cover one or the other of the respective latching bars 120, 122. The user interface can aid the user in making a choice of positions at which the infant seat 200 will be latched to the base 100. Thus, the user interface can facilitate latching of the carrier 200 in the intended position.

FIGS. 6A-8C illustrate an alternative base 300 and infant carrier 400 to achieve a two position fit between an infant carrier and a base. As with the embodiment of FIGS. 1-5 described above, the carrier 400 of this embodiment can function in a first position as a reclined infant car seat for a newborn, and, in a second, more upright position, the carrier 400 can accommodate the space needs of a growing infant. The carrier 400 can be structurally similar to carrier 200. However, as compared to carrier 200, carrier 400 can have two pins 410 in curved supports 421 on either side of the lower surface 406 of the carrier shell 402 (see pin 410 in one of the curved supports 421 in FIGS. 8B and 8C), instead of latches 220. Also, carrier 400 can have a release actuator, such as handle 404, that includes only a single arm 406 extending to a hook 440, instead of a handle 230 that has a central arm 238 extending to a hook 240 and two additional side arms 236.

As shown in FIGS. 6A-6D, the base 300 is an assembly that includes a fixed base 310 and a movable base 330 that can move relative to the fixed base 310. The fixed base 310 includes a belt path 311 along which a vehicle belt can be secured to the base assembly 300, such that the movable base 330 can be moved between a first position and a second position, as described below, without requiring adjustment of the vehicle belt relative to the fixed base 310.

In the embodiment of FIGS. 6A-8C, the movable base 330 can slide between a first position (see FIG. 6C) and a second position (see FIG. 6D) relative to the fixed base 310. When the movable base 330 is in the first position, and the infant carrier 400 is coupled to the base assembly 300, as will be described below, the infant carrier 400 is at an orientation appropriate for a newborn; for example, in the first position, the seat back of the carrier 400 can be at an angle of 45° from vertical. When the movable base 330 is in the second position, and the infant carrier 400 is coupled to the base assembly 300, the infant carrier 400 is at an orientation more appropriate for an older infant with developed neck and shoulder muscles and increased head control; for example, in the second position, the seat back of the carrier 400 can be at an angle of 35° from vertical. In this second position, the growing infant can sit more upright relative to the first position and can interact more with the surrounding environment.

Figure 6A:
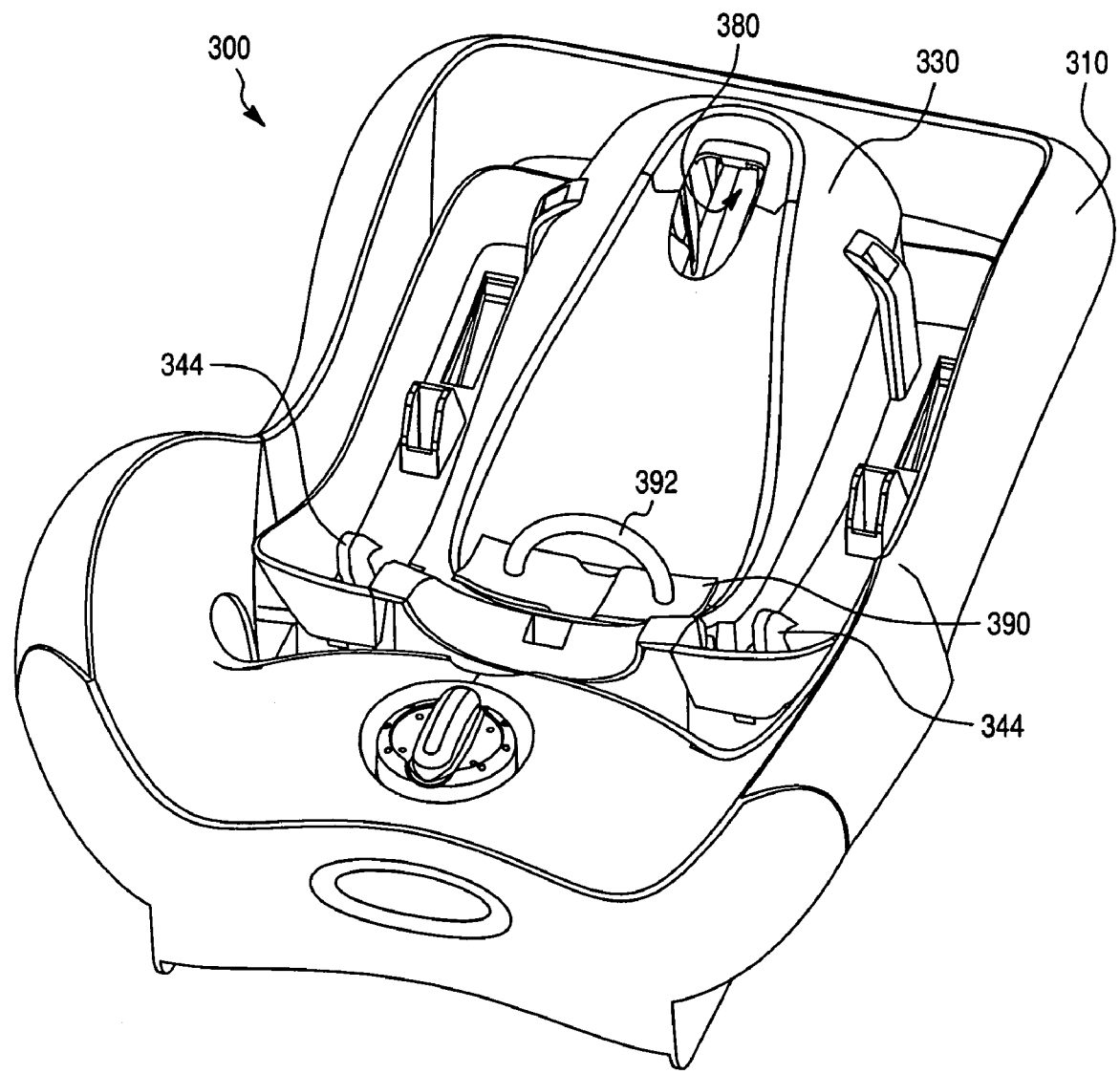
FIG. 6A is a top perspective view of a base assembly of another exemplary infant car seat, in which the base assembly includes a fixed base and a movable base.
Figure 6B:
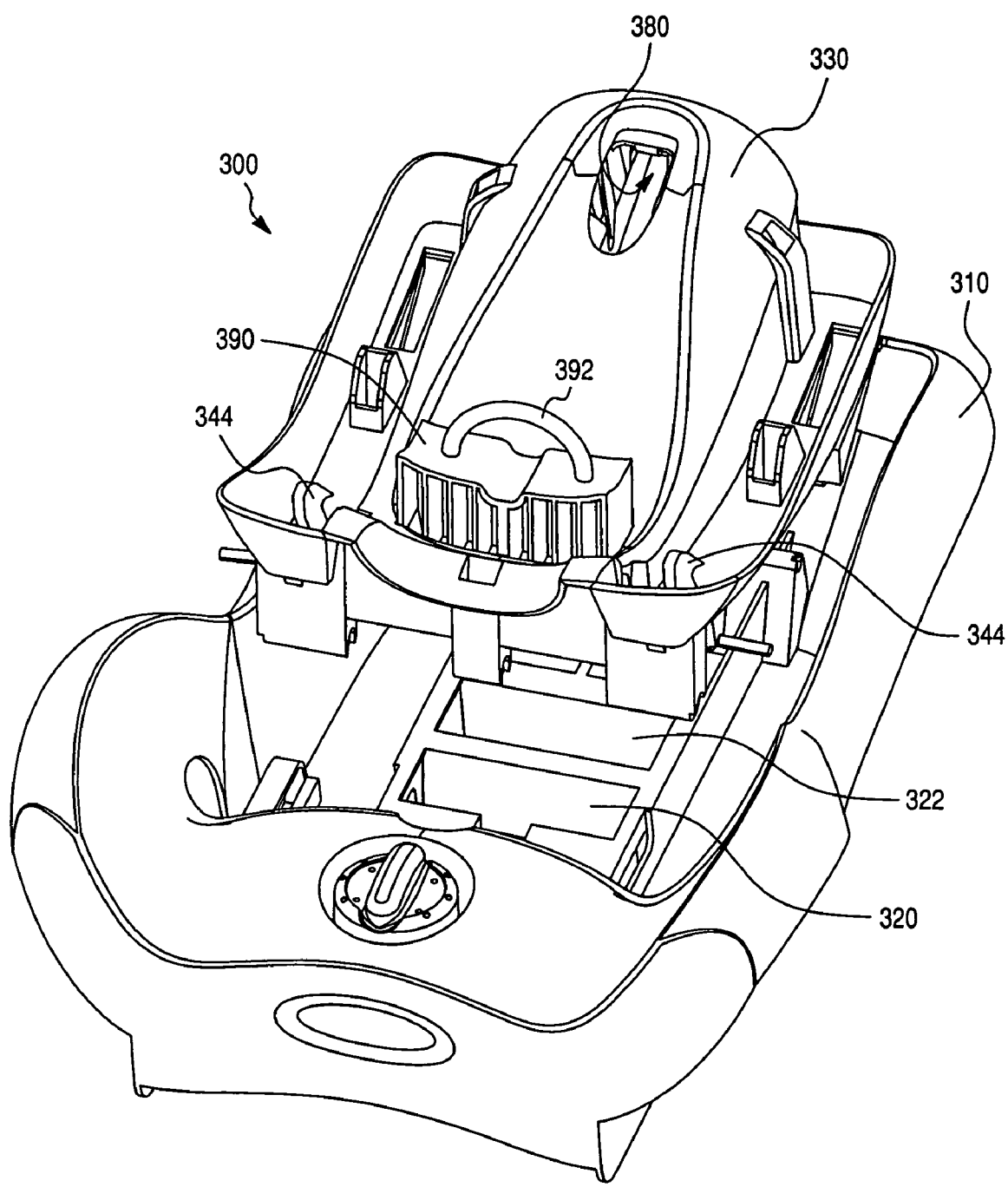
FIG. 6B is an exploded, top perspective view of the base assembly of FIG. 6A.
Figure 6D:
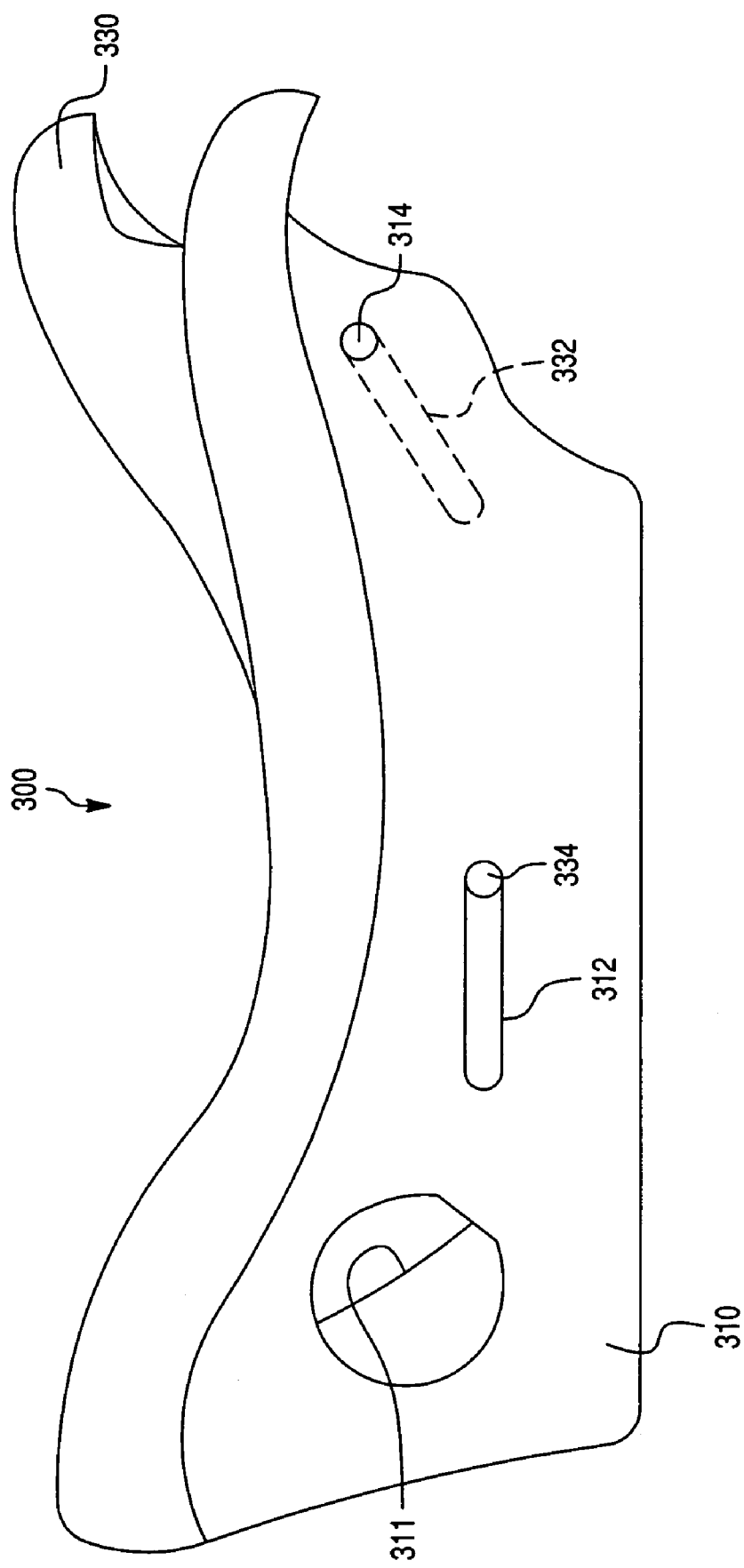
FIG. 6D is a side view of the base assembly of FIG. 6A, in which the movable base is in a second position.

FIGS. 6C and 6D show the base assembly 300 in the first and second positions, respectively. In FIG. 6C, illustrating the first position, the movable base 330 is obscured by the sidewall of the fixed base 310. In FIG. 6D, illustrating the second position, the movable base 330 extends above an upper edge of the sidewall of the fixed base 310. To enable movement of the movable base 330 on the fixed base 310, the fixed base 310 includes a slot 312 along each of its sidewalls and a pin 314, and the movable base 330 includes a slot 332 along each of its sidewalls and a pin 334. Slot 312 of the fixed base 310 can slidably receive pin 334 of the movable base 330, and slot 332 of the movable base 330 can slidably receive pin 314 of the fixed base 310. In the first position, as shown in FIG. 6C, the pins 314, 334 are positioned at one end of the respective slots 332, 312. In the second, more upright position, as shown in FIG. 6D, the pins 314, 334 are positioned at the other end of the respective slots 332, 312. As can be understood from comparing FIGS. 6C and 6D, when a carrier 400 is secured to the movable base 330, the carrier 400 will assume a more upright orientation in the second position than in the first position.

To lock the movable base 330 in one of the two positions in the fixed base 310, the fixed base 310 can include a pair of receiving apertures 320, 322, and the movable base 330 can include a locking actuator 390 that can be received in either of apertures 320, 322, as shown in FIGS. 6A and 6B. The locking actuator 390, which can be a block-like member having a handle 392, fits in a slot 391 (see FIG. 7) in the movable base 330. When the locking actuator 390 is lifted out of the slot 391 in the movable base 330, the movable base 330 can slide between the first and second positions shown in FIGS. 6C and 6D, respectively. To lock the movable base 330 in the first position, the movable base 330 can be slid to the position shown in FIGS. 6A and 6C, in which slot 391 and receiving aperture 320 are aligned, and the locking actuator 390 can be placed through the slot 391 and into the receiving aperture 320. To lock the movable base 330 in the second position, the movable base 330 can be slid to the position shown in FIG. 6D, in which slot 391 and receiving aperture 322 are aligned, and the locking actuator 390 can be placed through the slot 391 and into the receiving aperture 322.

Attachment of the carrier 400 to the movable base 330 now will be described with reference to FIGS. 7, 8A, 8B, and 8C. The movable base 330 generally can include a front rod 342, two latch hooks 344, two torsion springs 346, a release link 348, and a lever link 350. As part of the mechanism for latching the carrier shell 400 to the base 300, the carrier shell can include a release actuator, such as a handle 404, and a hook 440.

To retain the carrier shell 402 on the base 300, the carrier shell 402 can have a pin 410 on each curved support 421, as mentioned above. The pins 410 can be releasably engaged by the latch hooks 344 on the movable base 330. In addition, hook 440 of the carrier 400 can engage a shoulder 382 of the movable base 330 via hook-receiving slot 380. Movement of the movable base 330 between the first position shown in FIG. 6C and the second position shown in FIG. 6D thus moves the carrier 400 between a reclined position and an upright position, respectively. When the release handle 404 is actuated, the hook 440 pivots away from shoulder 382, and the latch hooks 344 of the movable base 330 also pivot, as will be described below, to release the carrier 400 from the movable base 330.

Referring to FIGS. 8B and 8C, when the carrier 400 is installed on the movable base 330, the hook 440 on the carrier 400 and the lever link 350 on the movable base 330 make surface contact with each other. That is, surface 351 of the lever link 350 contacts surface 441 of the hook 440. When the handle 404 of the carrier 400 is actuated, the hook 440 rotates and slides along surface 351 of the lever link 350 to cause actuation of the remaining components of the latch mechanism of the movable base 330, as now will be described.

Figure 7:
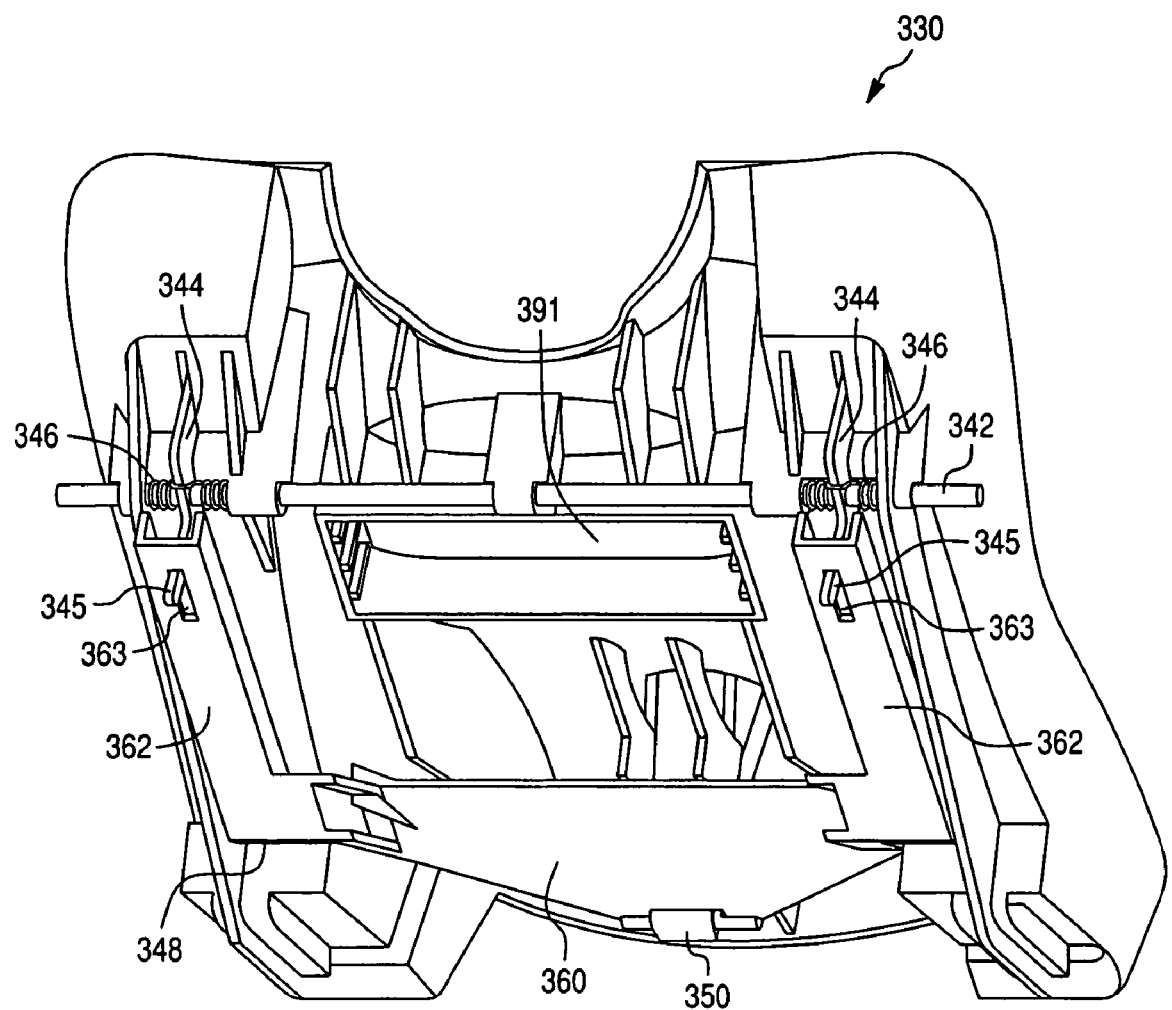
FIG. 7 is a bottom perspective view of the movable base of the base assembly of FIG. 6A.
Figure 8A:
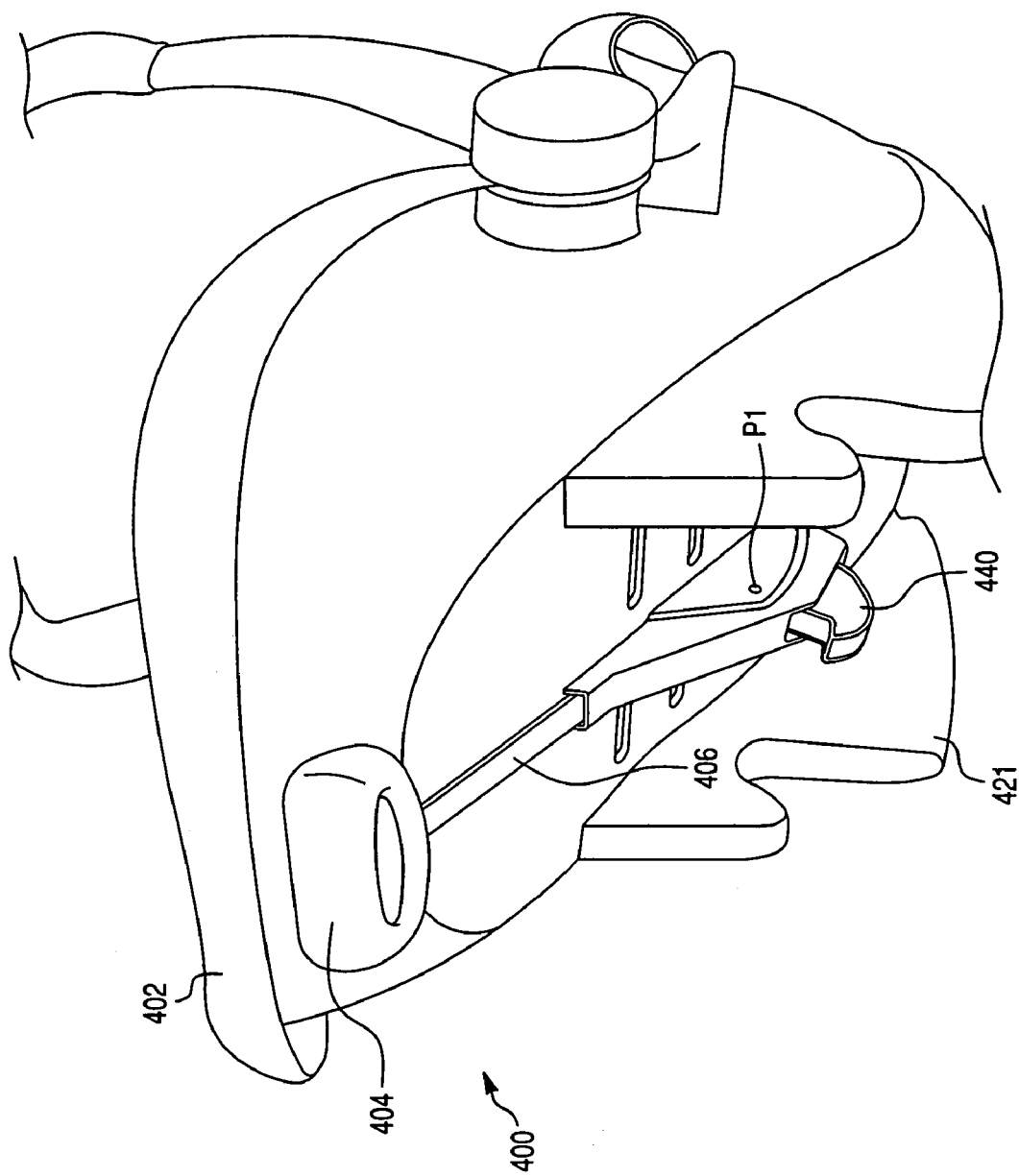
FIG. 8A is a perspective view of a carrier suitable for use with the base assembly of FIG. 6A.

To release the carrier 400 from the base 300, a user can squeeze the handle 404 on the carrier shell 402. Squeezing the handle 404 triggers rotating movement of the hook 440 about pivot P1 away from the shoulder 382 in the hook-receiving slot 380 in the movable base 330. Rotation of the hook 440 causes rotation of the lever link 350 about a center pivot point P2 of the lever link 350. The lever link 350 is pivotally attached to the base 330 and is snapped onto the release link 348 that extends between the lever link 350 and each of the latch hooks 344. In this regard, as seen in FIG. 7, the release link 348 has a central section 360 and two arms 362 that extend from the central section 360 to each of the latch hooks 344. The latch hooks 344 each have a tail 345 that extends through a slot 363 at the end of the respective release link arm 362. Rotation of the lever link 350 moves the release link 348 from a rest position, as shown in FIG. 8B, to an actuated position, as shown in FIG. 8C. As the release link 348 moves, the latch hooks 344 rotate around the front rod 342 and away from the receiving pins 410 of the infant carrier 400, thereby releasing the infant carrier 400 from the base 300. The two torsion springs 346 return the latch hooks 344, the release link 348, and the lever link 350 to the rest position when force from the handle 404 is removed.

FIGS. 8B and 8C illustrate that the kinematic motion of parts can be achieved by pivotal rotation of one part (hook 440) causing another contacting part (lever link 350) to rotate. The hook 440 and the lever link 350 can be molded parts. The hook 440 can have a protrusion at its pivot point P1 via which the hook 440 can be snapped onto the carrier shell 402. The lever link 350 likewise can have a protrusion at its pivot point P2 that can be snapped onto the underside of the movable base 330. The hook 440 and the lever link 350 are in constant contact while the infant carrier 400 is mounted to the movable base 330, so that, as one part rotates, the other part also rotates due to surface contact between the parts.

The embodiment of FIGS. 6A-8C provides an advantage as compared to conventional infant car seats. Infant carriers are generally heavy since they must be structurally robust to withstand crash impact energy and since the latching features on the carrier are typically made of steel. Relocating certain steel latching features to the movable base 330 reduces the weight of the infant carrier 400 and, hence, reduces user discomfort and fatigue resulting from transporting the carrier. Moreover, because the infant car seat can be rated to a high weight range of, for example, 5-30 pounds, and because the seat back height is relatively long at, for example, 21.5 inches, a way to compensate for the added weight of the plastic carrier is to transfer latching features from the carrier to the base.

In another aspect of the invention, the carrier can include one or more grips 502, 504 that facilitate carrying of the carrier and the infant, as shown in FIG. 9. Human ergonomics suggests that switching carry positions will mitigate the effects of carrying fatigue, especially when the carrying periods are long and frequent. Human ergonomics also suggests that carrying weight closer to the body's center will bring the center of gravity of both the person and the carried object close to each other, which is the ideal way to carry weight to minimize fatigue. Accordingly, the carrier can include grips 502, 504 to reduce carrying fatigue.

FIG. 9 shows an exemplary grips 502, 504 on carrier 200. As mentioned above, the seat shell 202 includes an upper surface 206 defining an infant seating area 208 and a lower surface 204 to secure to the base 100. A perimeter 214 defines the outer boundary of upper surface 206. Grips 502, 504 can be coupled to the perimeter 214 of the shell 202, as shown in FIG. 9. The grips 502, 504 can be made of a material that is more compressible than the material of the seat shell 202, such that the grips 502, 504 provide a friendly surface for the caregiver to hold while carrying the carrier 200. By way of example, suitable grip materials can include thermoplastic elastomers such as polybutadiene, polyisobutylene, polyurethane, and polyisoprene, and suitable seat shell materials can include copolymers such as polypropylene. The grip material can provide a tactile material that is softer and has a lower durometer than the material of the seat shell.

In one embodiment, first and second grips 502, 504 are coupled to opposite sides of the perimeter 214 of the seat shell 202 so that a caregiver can hold the carrier 200 comfortably by the grips 502, 504. One grip 502 can be coupled to a foremost point of the seat shell 202, and the other grip 504 can be coupled to a rearmost point of the seat shell 202 relative to a direction of travel of the vehicle. The grips 502, 504 are spaced from each other and positioned at the farthest ends of the seat shell 202, which, as compared to carrying the seat shell 202 by handle 900, allows the caregiver to carry the seat shell 202 closer to his or her body. The grips 502, 504 provide cushioning and can help lessen the effects of fatigue.

The grips 502, 504 can be directly coupled to the seat shell 202, as shown in FIG. 9. The grips 502, 504 can comprise an overmold insert molded to the seat shell 202, a coating applied to the seat shell 202, or other suitable construction. Alternatively, the grips 502, 504 can be sewn, adhesively adhered, or otherwise coupled to a pad 201 (see FIG. 1) placed over the upper surface 206 of the seat shell 202, such that the grips 502, 504 are indirectly coupled to the seat shell 202 via placement of the pad 201 on the seat shell 202.

As can be seen in FIG. 9, the grips 502, 504 can conform to the shape of the perimeter 214 to which they are attached. For example, grip 502 shown attached to the foremost point of the seat shell 202 can have an outwardly curved shape, and grip 504 shown attached to the rearmost point of the seat shell 202 can have a flattened shape or an inwardly curved shape.

In another exemplary embodiment, the seat shell 202 has an outer rim 216 that at least partially encircles the infant seating area 202. As seen in FIG. 3A, the outer rim 216 smoothly curves away from the upper surface 206 of the seat shell 202. Typically, the pad 201 is secured to this outer rim 216. The grips 502, 504 can be coupled, either directly or indirectly, to this outer rim 216 via the techniques described above.

According to another aspect of the infant car seat 10, the infant car seat 10 can include a gripping material 600 on the base shell. FIG. 11 shows exemplary gripping material 600 on base shell 102. The base shell 102 has a rear wall 106 to place in juxtaposition with a seat back 1000 of the vehicle seat, as shown in FIG. 10. The rear wall 106 has an outer surface, and the gripping material 600 can cover at least a portion of this outer surface to contact the vehicle seat back and aid in securing the base 100 in the vehicle. To effect this result, the base shell 102 has a first coefficient of friction, and the gripping material 600 has a second coefficient of friction greater than the first coefficient of friction.

The gripping material 600 can completely cover the outer surface of the rear wall 106, or it can cover only a portion of the rear wall 106 in a random arrangement or in a patterned arrangement (for example, vertical strips, horizontal strips, or crisscrossed strips). While the base shell 102 can comprise a copolymer such as polypropylene, the gripping material 600 can comprise a thermoplastic elastomer such as polybutadiene, polyisobutylene, polyurethane, and polyisoprene, or it can comprise another material with superior frictional properties, such as 3M's gReptile™ gripping material. Alternatively, the gripping material 600 can comprise a coating on the outer surface of the rear wall 106. The gripping material 600 ideally should not abrade or otherwise damage the material of the vehicle seat.

According to a further aspect of the infant car seat 10, the infant car seat 10 can include a knee grip 700. FIG. 2 shows an exemplary knee grip 700 on base 100. The knee grip 700 is disposed on the upper surface of the base shell 102 between first and second sidewalls of the base 100, such as opposing sidewalls 108. The knee grip 700 can be proximate to the belt path 150. The knee grip 700 provides a comfortable surface on which the caregiver can place his knee during installation of the base 100 in a vehicle. To tightly install the base 100, a caregiver can apply his body weight to the base 100 by placing his knee on the knee grip 700 and, at the same time, can pull the vehicle seat belt tight across the base 100.

Figure 12:
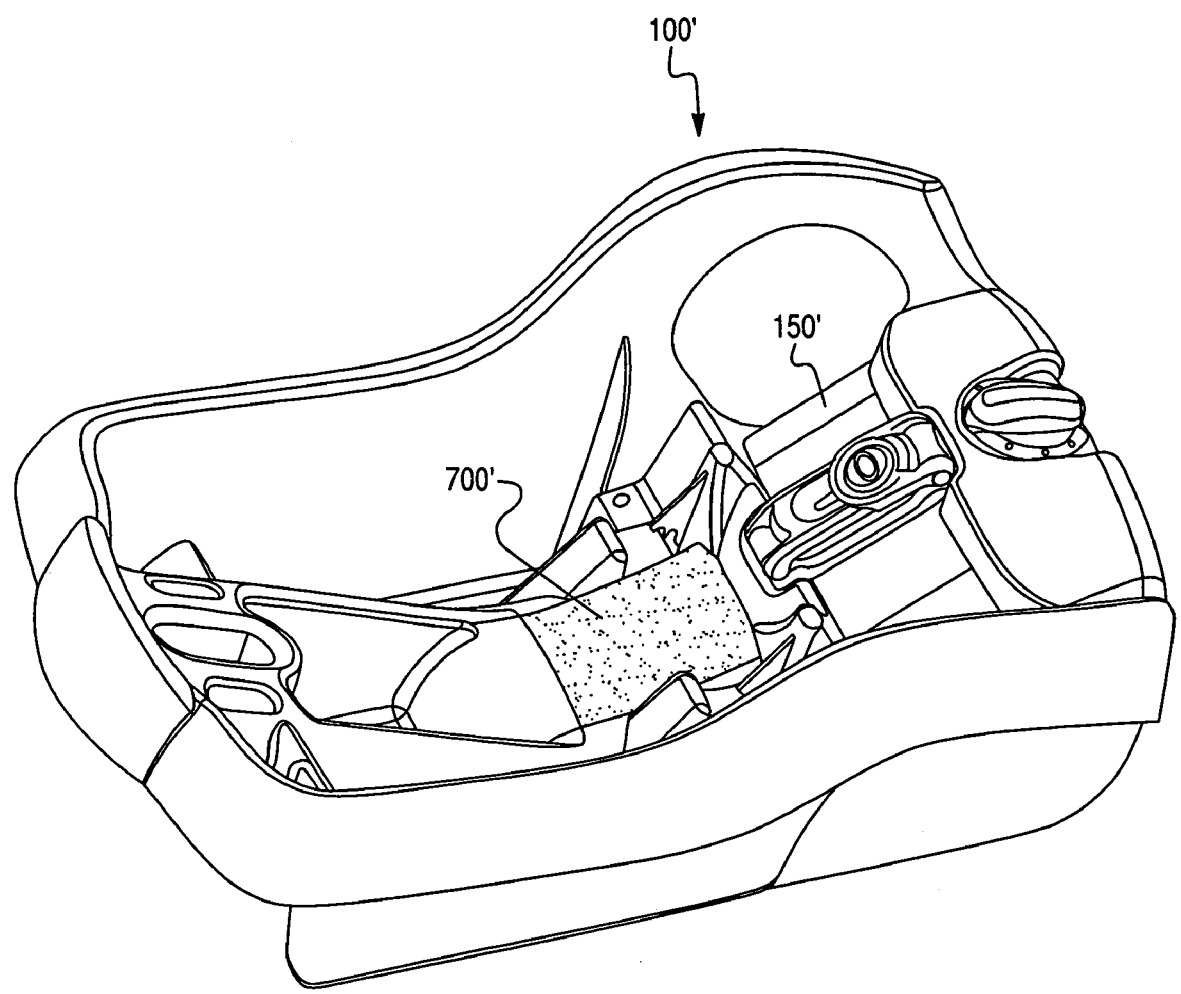
FIG. 12 is a top perspective view of a base that includes a knee grip for facilitating installation of the base on the vehicle seat.

The knee grip 700 is made of material that is more compressible than the material of the base shell 102. By way of example, suitable materials for the knee grip 700 can include thermoplastic elastomers such as polybutadiene, polyisobutylene, polyurethane, and polyisoprene, and suitable base shell materials can include copolymers such as polypropylene. The grip material can provide a tactile material that is softer and has a lower durometer than the material of the base shell. The knee grip 700 can comprise an overmold insert molded to the base shell 102, a coating applied to the base shell 102, or other suitable construction to pad the base shell 102. It will be understood that knee grip material may extend to other parts of the upper surface of the base 100, for example, parts distal to the belt path 150 such as receptacles 140, 142, as shown in FIG. 2. Alternatively, as shown in FIG. 12, knee grip material may be located solely at the knee grip 700' at a location proximate the belt path 150'.

As can be seen in FIG. 2, the opposing sidewalls 108 each can have an upper edge with an undulating side profile. In side profile, at least a majority of the knee grip 700 can be elevated above the lowermost point of the upper edge. The sidewalls 108 each can have a front portion 170, a rear portion 172, and an intermediate portion 174 that is lower than both the front and rear portions 170, 172. The intermediate portion 174, in side profile, can be lower than the knee grip 700. The intermediate portion 174 provides easy ingress for a caregiver's leg as the caregiver places his knee on the knee grip 700. Also, the knee grip 700 can be smoothly contoured, as can be seen from FIG. 2, such that there are no sharp edges in the knee grip 700 to cause the caregiver discomfort.

Figure 13:
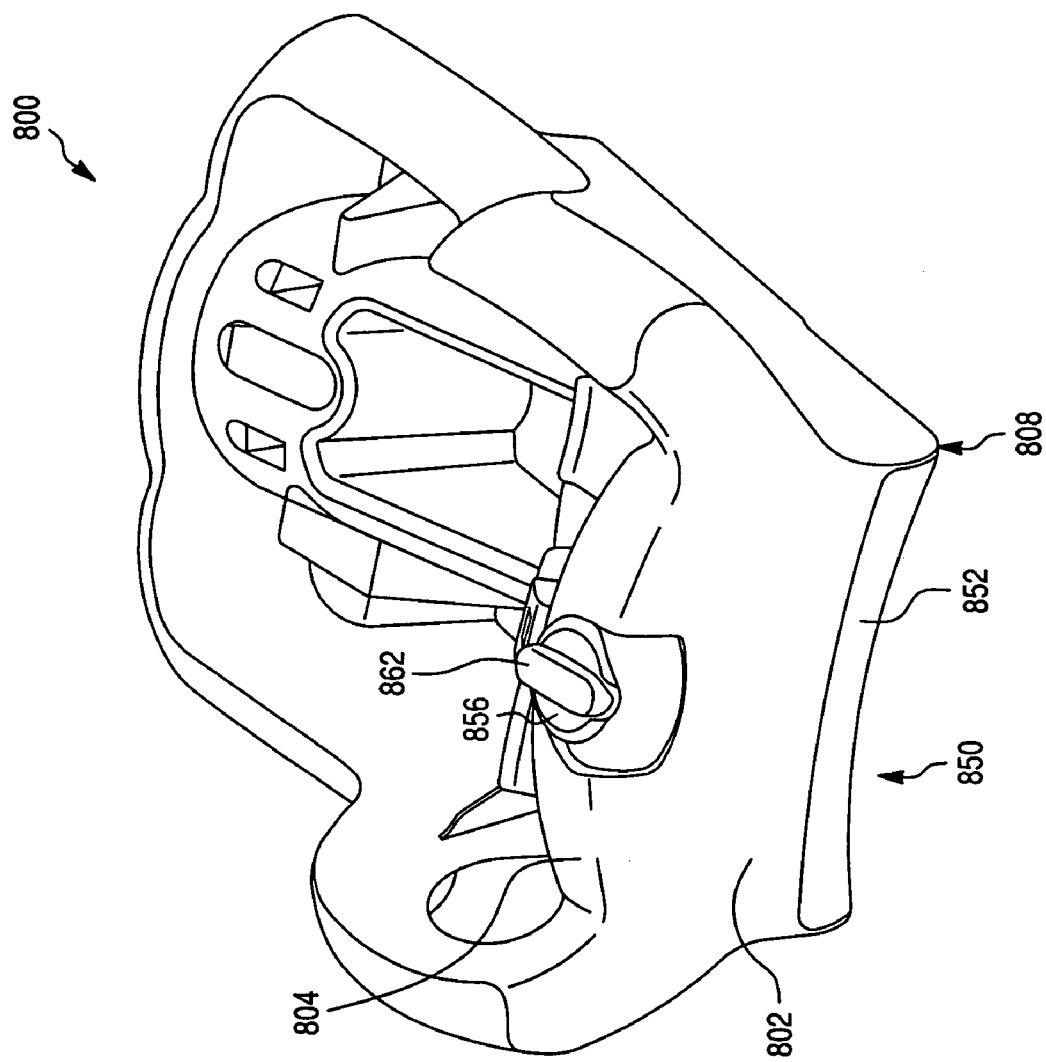
FIG. 13 is a top perspective view of a base that includes a height adjustment mechanism.
Figure 14:
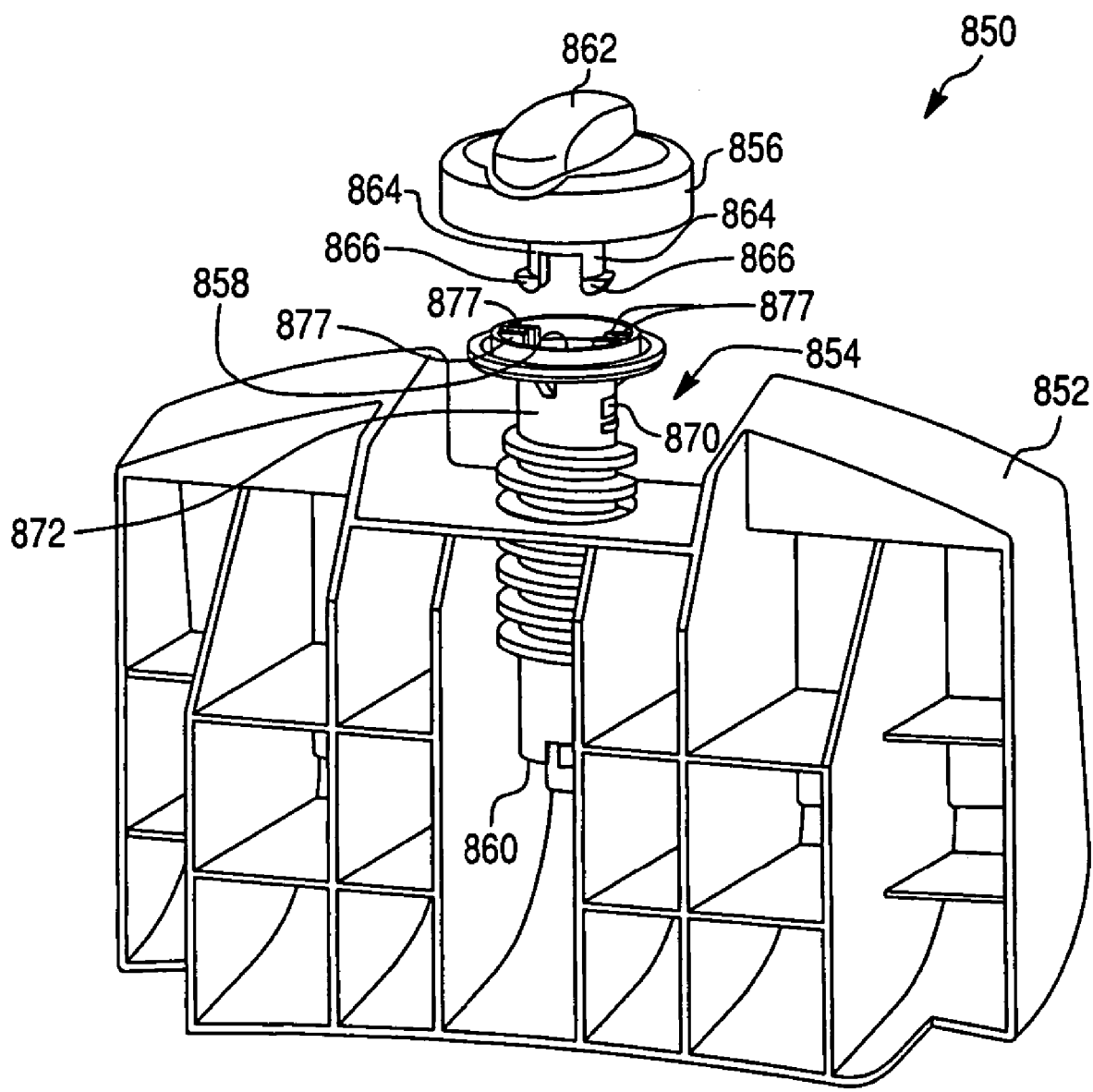
FIG. 14 is a partially exploded, front view of a foot, a threaded shaft, and an actuator of the height adjustment mechanism of FIG. 13.
Figure 15:
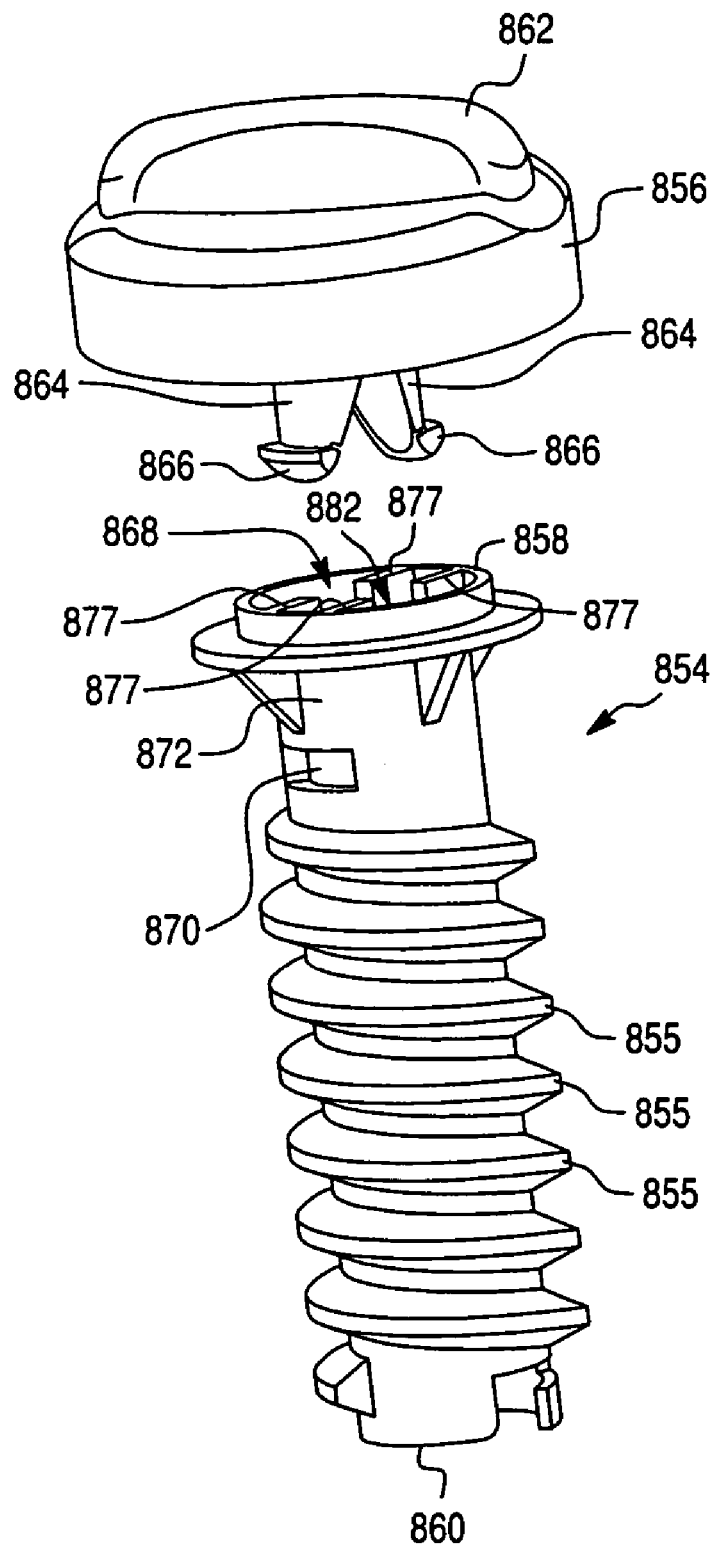
FIG. 15 is an exploded, top perspective view of the threaded shaft and the actuator of FIG. 14.
Figure 16:
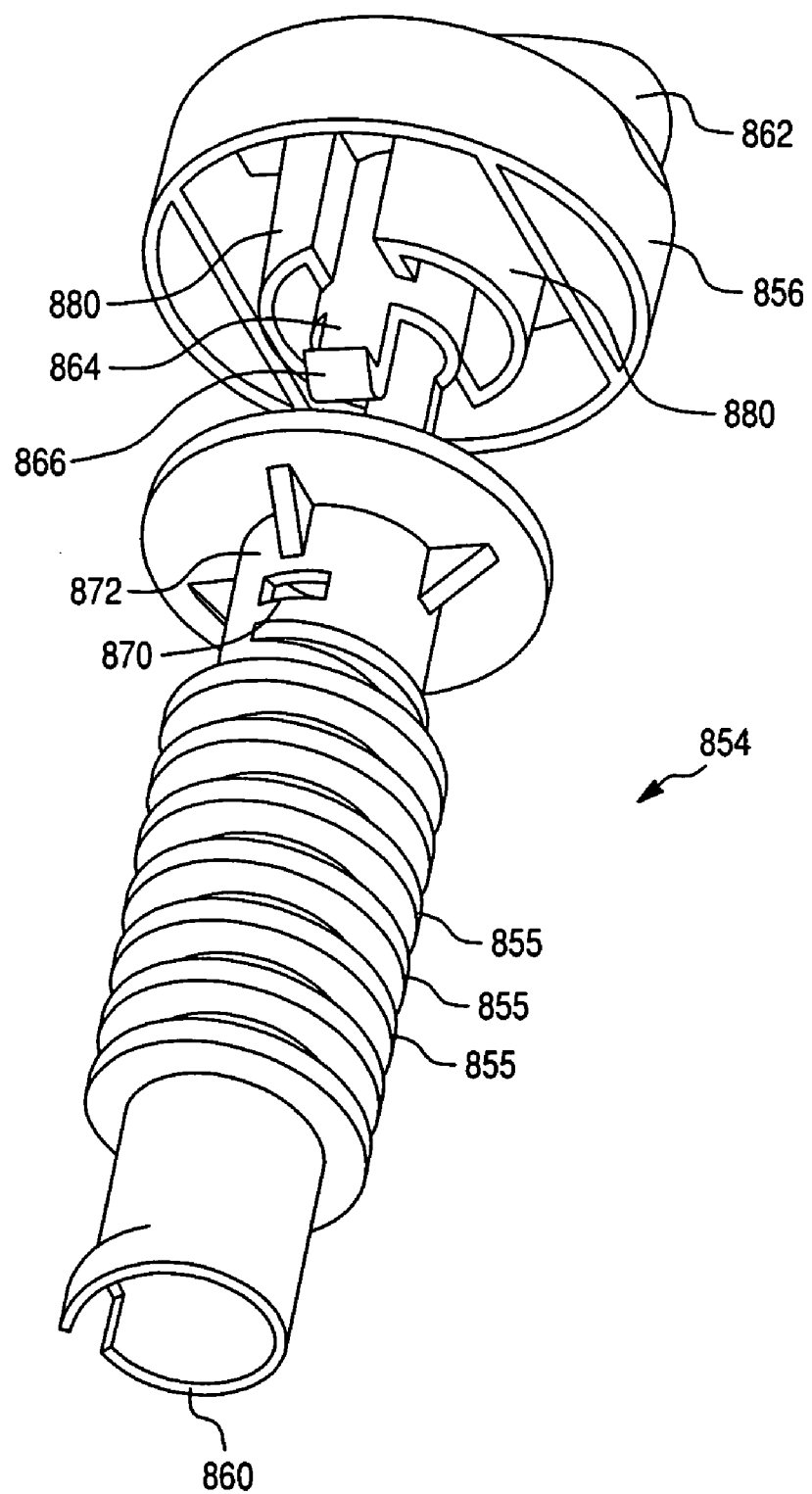
FIG. 16 is an exploded, bottom perspective view of the threaded shaft and the actuator of FIG. 14.

FIG. 13 illustrates another exemplary base 800 for an infant car seat that includes a height adjustment mechanism 850 to adjust the end of the base 800 that is placed in juxtaposition with a seat back of a vehicle seat. FIG. 14 shows a partially exploded view of the height adjustment mechanism 850, and FIGS. 15 and 16 show exploded views of components of the height adjustment mechanism 850. The height adjustment mechanism 850 generally includes a foot 852, a threaded shaft 854, and a manual actuator such as a knob 856.

The foot 852 is disposed proximate to the height adjustment end of the base 800, for example, adjacent a rear wall 802 of the base 800. As shown in FIG. 13, the foot 852 can be disposed beneath the height adjustment end of the base 800. The foot 852 has a threaded opening (obscured in FIG. 14 by threaded shaft 854). The threaded shaft 854 is rotatably coupled to and engages the threaded opening of the foot 852. The threaded shaft 854 has a first end 858 and a second end 860. The knob 856 is coupled to the first end 858 of the shaft 854 in a linear arrangement, as shown in FIG. 14 and to the height adjustment end of the base 800, as shown in FIG. 13.

As can be seen in FIG. 13, the knob 856 can be exposed on the upper surface 804 of the base 800. The knob 856 has a grip 862 for a user to grasp while rotating the knob 856. A user can hold the grip 862 and rotate the knob 856 to cause the threaded shaft 854 to rotate and translate relative to the threaded opening of the foot 852, thereby adjusting the foot 852 relative to the base 800.

As can be seen in FIGS. 14-16, the knob 856 can have a pair of downwardly-depending flanges 864 and a pair of tabs 866 at the ends of the flanges 864. The threaded shaft 854, in turn, can have an inner recess 868 to receive the flanges 864. Alignment ribs 877 can be provided in the inner recess 868 to guide the flanges 864 into the recess 868. The threaded shaft 854 also has a pair of slots 870 on collar 872 to receive the pair of tabs 866 to lock the knob 856 to the threaded shaft 854.

To assemble the height adjustment mechanism 850 to the base 800, the threaded shaft 854 first can be screwed into the threaded opening of the foot 852. The threaded opening through the foot 852 has at least one full thread to threadedly engage the threads 855 of the threaded shaft 854. The threaded opening through the foot 852 can have a female thread, and the threads 855 of the threaded shaft 854 can be male threads. In an alternative arrangement, the threaded opening of the foot 852 can have a male thread, and the threads 855 of the threaded shaft 854 can be female threads. The foot 852 and shaft 854 then can be positioned beneath the base 800, proximate to the rear wall 802 of the base 800, and the shaft 854 can be aligned with an aperture through the upper surface 804 of the base 800. From the upper surface 804 of the base 800, the knob 856 can be pushed onto the first end 858 of the shaft 854 until tabs 866 snap into the slots 870 of the shaft 854. As seen in FIG. 16, the knob 856 includes curved wall portions 880 that can slidably engage the inner wall 882 of the threaded shaft 854. The curved wall portion 880 are spaced from each other to accommodate ribs 877 of the threaded shaft 854 as the knob 856 is pushed onto the shaft 854. Assembling the knob 856 to the foot 852 sandwiches the base shell between the knob 852 and the threaded shaft 854.

The linear arrangement of the shaft 354 and the knob 356 results in a robust and cost-effective mechanism to maintain the proper base shell angle in different kinds of vehicle seats. The height adjustment mechanism 850 enables movement of the base 800 from a lowered position to a heightened position. The distance between the lowered position and the heightened position, measured at the lower edge 808 of the rear wall 802 of the base 800, can be about 3.6 inches (such as 3.6 inches). By comparison, height adjustment mechanisms currently on the market offer travel up to 2.5 inches only.

Referring to FIG. 14, when the knob 856 is turned clockwise, the shaft 854 can move upward, out of the foot 852. Consequently, the foot 852 and the underside of the base 800 opposite surface 804 move away from each other, causing the base 800 to rise to a heightened position. To move the base 800 to a lowered position, the knob 856 can be turned counter-clockwise, which causes the shaft 854 to move downward, into the foot 852. For flatter seats, the foot 850 can be fully retracted beneath the base 800 by turning the knob 856 counter-clockwise. This interplay between the foot 850 and the base 800 helps maintain a proper base shell angle on the vehicle seat.

The infant car seat 10 can include a handle 900 fitted with entertainment features (now shown) to make the environment inside the vehicle entertaining and stimulating to the child. Lights, nature sounds, music, and vibration provide enjoyment, recreation, and stimulation to the child's mind and brain. Associated electronics can be embedded in the underside of the handle 900, or they can be attached to the handle 900 as a separate add-on module. The entertainment features can be activated via buttons on the handle 900 or using remote control.

Data in Tables 1 and 2 below compares an infant car seat in accordance with the invention to eight other commercially available infant car seats, namely, Seats 1-8. Each measurement parameter will be discussed below in detail (although the discussion will refer to the infant car seat embodiment of FIGS. 1-5 for ease of understanding, the discussion also is applicable to the infant car seat embodiment of FIGS. 6A-8C).

TABLE 1

| Seat Name/<br>Seat Features | Carrier<br>Weight | Rated<br>Weight | Rated<br>Height | Seat Back<br>Length |
| --- | --- | --- | --- | --- |
| Seat 1 | 8 lbs. | 20 lbs. | 26" | 18" |
| Seat 2 | 9 lbs. | 28.6 lbs. | 29" | 20" |
| Seat 3 | 8.5 lbs. | 22 lbs. | 29" | 19" |
| Seat 4 | 8.75 lbs. | 22 lbs. | 26" | 18" |
| Seat 5 | 7 lbs. | 22 lbs. | 26" | 19" |
| Seat 6 | 6.25 lbs. | 22 lbs. | 29" | 19" |
| Seat 7 | 10 lbs. | 35 lbs. | 35" | 19.5"-21.5" |
| Seat 8 | 6.75 lbs. | 20 lbs. | 26" | 18" |
| Infant Car Seat | 7.8 lbs. | 35 lbs. | 35" | 21.75" |

TABLE 2

| Seat Name/<br>Seat Features | Car<br>Envelope | Legroom | Base Footprint on<br>Vehicle Seat |
| --- | --- | --- | --- |
| Seat 1 | 24.5" | 1" | 19.5" |
| Seat 2 | 26.5" | 0" | 23" |
| Seat 3 | 28.5" | 1.5" | 21" |

TABLE 2-continued

| Seat Name/<br>Seat Features | Car<br>Envelope | Legroom | Base Footprint on<br>Vehicle Seat |
|---|---|---|---|
| Seat 4 | 26.5" | 1.5" | 18" |
| Seat 5 | 24" | 0" | 21" |
| Seat 6 | 24" | 0" | 17.5" |
| Seat 7 | 27"-28" | 0" | 16.5" |
| Seat 8 | 26.5" | 2" | 19" |
| Infant Car Seat | 27.75" | 1.75-2.875" | 19.5" |

The carrier weight in Table 1 refers to the weight of the carrier in pounds. The carrier weight of an infant car seat in accordance with the invention can be less than 10 pounds, for example, about 7.8 pounds, such as 7.8 pounds. In another exemplary embodiment, the carrier weight can be about 6.75 pounds, such as 6.75 pounds.

The rated weight refers to the maximum weight of a child who can safely occupy the infant car seat and is assigned by a manufacturer in accordance with the guidance provided by National Highway Traffic Safety Administration (NHTSA) Regulation FMVSS 571.213. The manufacturer assigns a rated weight based on testing the infant car seat with various standardized crash dummies (for example, a newborn test dummy conforming to part 572, subpart K; a 9-month old test dummy conforming to part 572 subpart J; or a 3-year-old test dummy conforming to part 572, subpart C). The infant car seat in accordance with the invention can have a rated weight of up to 40 pounds, or, alternatively, a rated weight of up to 35 pounds, such as 35 pounds. For example, the infant car seat can have a rated weight of greater than about 22 pounds (such as greater than 22 pounds), or a rated weight of at least about 27.5 pounds (such as 27.5 pounds), or a rated weight of greater than about 28.6 pounds (such as greater than 28.6 pounds).

The rated height refers to the maximum height of a child who can safely occupy the infant car seat and is assigned by a manufacturer in accordance with the guidance provided by National Highway Traffic Safety Administration (NHTSA) Regulation FMVSS 571.213. The manufacturer assigns a rated height based on testing the infant car seat with various standardized crash dummies (for example, a newborn test dummy conforming to part 572, subpart K; a 9-month old test dummy conforming to part 572 subpart J; or a 3-year-old test dummy conforming to part 572, subpart C). The infant car seat in accordance with the invention can have a rated height of up to 35 inches, such as 35 inches.

The seat back length is a fit to child metric. The seat back length pertains to the seated height of the child from the child's bottom to the top edge of the seat shell 200. The seat back length refers to the distance along a front surface 206 of the seat back 210 of the carrier 200, measured from the seat bight SB to an uppermost point of the seat back 210, along a longitudinal axis bisecting the carrier 200, as shown in FIG. 18. An infant car seat in accordance with the invention can have a seat back length of greater than about 20 inches (such as greater than 20 inches), for example, a length of about 21.5 inches (such as 21.5 inches) or a length of about 21.75 inches (such as 21.75 inches).

Figure 19:
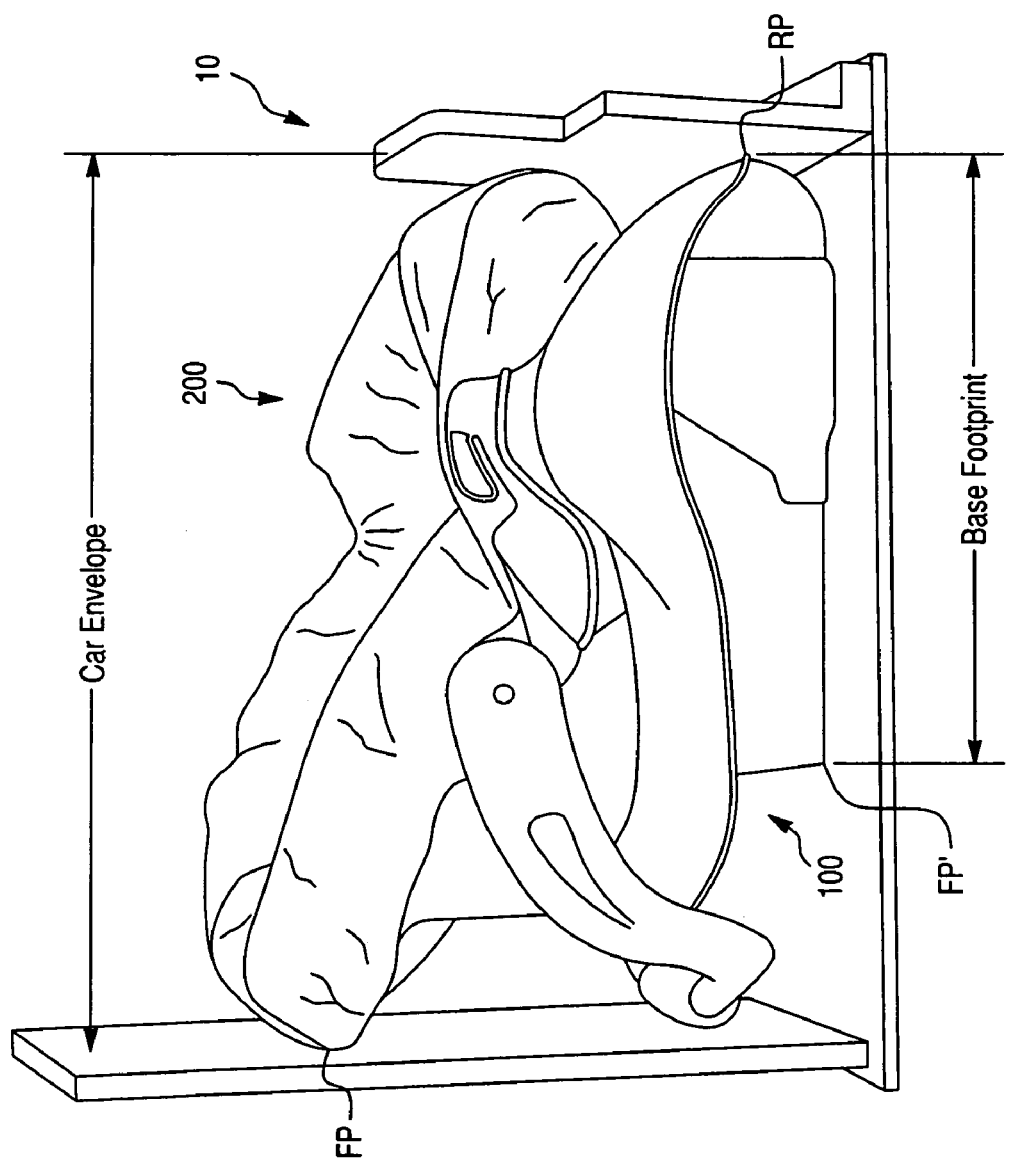
FIG. 19 is a side view of the infant car seat that illustrates the car envelope measurement and the base footprint measurement of the infant car seat.

The car envelope is a fit to vehicle metric. The car envelope signifies the space occupied by the infant car seat 10 when installed in the rear seat of a vehicle. The car envelope is measured from the foremost point FP of the infant car seat 10 to the rearmost point RP of the infant car seat 10, as shown in FIG. 19. In the illustrated embodiment, the foremost point FP is at the foremost point of the carrier 200, and the rearmost point is at the rearmost point of the base 100. An infant car seat in accordance with the invention can have a car envelope of about 27.75 inches (such as 27.75 inches) or, alternatively, a car envelope of about 28 inches (such as 28 inches).

Legroom is a fit to child metric. The legroom measurement indicates the space available for the child's lower leg and feet. Legroom is measured along a horizontal plane from the upper rear edge 211 of the carrier 200 to a seat back 1000 of the vehicle seat, as shown in FIG. 17. An infant car seat in accordance with the invention, in which the carrier can move between a first, reclined position and a second, upright position relative to the base, can provide up to 3.5 inches of legroom for the infant, or, in another embodiment, up to 2.875 inches of legroom for the infant. For example, in one embodiment, the available legroom ranges from about 1.0 inches (such as 1.0 inch) of available legroom in the first, reclined position to up to about 3.5 inches (such as 3.5 inches) of available legroom in the second position. In another embodiment, the available legroom ranges from about 1.75 inches (such as 1.75 inches) of available legroom in the first, reclined position to up to about 2.875 inches (such as 2.875 inches) of available legroom in the second position. The available legroom of the infant car seat 10 thus can be greater than 2 inches in the second position.

The base footprint is a fit to vehicle metric. The base footprint represents the length of the bottom surface of the base 100 that contacts the vehicle seat. The base footprint is measured from the foremost point FP' of the base that is in contact with the vehicle seat to the rearmost point RP of the infant car seat 10, as shown in FIG. 19. An infant car seat in accordance with the invention can have a base footprint of about 19.5 inches, such as 19.5 inches.

Each of the above-described characteristics of the infant car seat, i.e., carrier weight, rated weight, rated height, seat back length, car envelope, legroom, and base footprint, can vary independently, and the infant car seat of the invention includes infant car seats in which one or more of the above-described characteristics fall within the disclosed ranges.

As compared to commercially available car seats for infants, such as Seats 1-8 in Tables 1 and 2, the infant car seat 10 provides a superior fit to child and a superior fit to vehicle, while also offering the convenience of a carrier. As for fit to child, the infant car seat 10 can fit comfortably a child weighing up to 35 pounds and standing up to 35 inches tall and provides up to 3.5 inches of legroom, for example. As for fit to vehicle, the infant car seat 10 can measure 28 inches from front to back, for example, and, consequently, fits well in most popular automotive vehicles. As for carrying convenience, the carrier weight of the infant car seat 10 can be 7.8 pounds or, alternatively, 6.75 pounds, for example, both of which are smaller than most infant car seat carriers with rated weights only up to 22 pounds. The infant car seat 10 also features an ergonomic handle 900 that offers carrying comfort and flexibility to parents.

Fit to child, fit to vehicle, and carrying convenience now will be discussed.

The infant car seat 10 provides a comfortable fit to a 1-year old infant. The infant car seat 10 of FIGS. 1-5 has been crash tested with a 3-year old National Highway Transportation Safety Administration (NHTSA) approved dummy that weighs 35 pounds and measures 38.5 inches in height. Per data released by the Centers for Disease Control and Prevention (CDC), a $95^{th}$ percentile 1-year old will weigh 27.5 pounds and will measure 31.75 inches in length. The infant car seat 10 can accommodate a child of a weight up to 35 pounds and a height up to 35 inches, for example. Proper fit to a child is made possible by the two-position base/carrier arrangement that allows the carrier 200 to rotate between two positions relative to the base 100, as described in detail above. By rotating 10 degrees within the base 100 from Position 1 to Position 2, as shown in FIG. 5, the carrier 200 can create a total legroom of up to 3.5 inches. This additional legroom occurs without increase in the space occupied by the infant car seat 10 in the vehicle, and it offers enough legroom and space for a 95$^{th}$ percentile 1-year old male child. A seat back length of about 21.5 inches also contributes to the superior fit to child.

The infant car seat 10 also allows for a compact fit inside the vehicle. Convertible car seats can take up to 31 inches inside the vehicle when placed in rear-facing mode. This space requirement can cause discomfort to driver and/or the front passenger, as their vehicle seats need to be moved closer to front of vehicle to provide space for the convertible car seat. The car envelope measurement of the infant car seat 10 can be about 28 inches, for example, and does not change between the first and second positions of the carrier 200. Also, the base footprint of the infant car seat 10 can measure only about 19.5 inches, which is very comparable to conventional car seats. Hence, without compromising on car fit, that is, without requiring additional in-vehicle space, the infant car seat 10 provides a comfortable fit to a child, to a driver, and to a front passenger.

Carrying convenience is an important consideration in selecting an infant car seat. The weight of the carrier added to the weight of a growing infant makes carrying tedious. Carrying fatigue is a major cause of frustration to parents. The infant car seat 10 is lightweight, which is facilitated by shifting heavier parts necessary for function from the carrier to the base and by optimizing material use in the carrier. Carrying convenience also is a factor of human ergonomics. The handle of the infant car seat 10 is ergonomically designed to offer the best carrying comfort and to reduce the effects of carrying fatigue normally associated with extended carrying times. The handle shape and cradle carry positions offer flexibility and choice to parents.

It will be understood that the infant car seat can be used in a variety of vehicles, including but not limited to cars, trucks, buses, and airplanes.

The preferred embodiments have been set forth herein for the purpose of illustration. This description, however, should not be deemed to be a limitation on the scope of the invention. Various modifications, adaptations, and alternatives may occur to one skilled in the art without departing from the claimed inventive concept. The true scope and spirit of the invention are indicated by the following claims.

What is claimed is:

1. An infant car seat, comprising:
a base including a belt path along which a vehicle belt can be secured to the base, the base presenting an upwardly facing surface and the base defining an outer perimeter;
a carrier connected to the base, the carrier presenting a downwardly facing surface that faces the upwardly facing surface of the base, and the carrier defining an outer perimeter; and
a latch mechanism disposed between the upwardly facing surface of the base and the downwardly facing surface of the carrier, the latch mechanism defining first and second mounting locations, such that in the first mounting location the carrier is positioned in a first reclined position, and in the second mounting location the carrier is positioned in a second upright position, wherein releasing the latch mechanism allows the carrier to move between the first and second positions and further allows the carrier to be removed from the base without disconnecting any additional attachments between the carrier and the base, and wherein the latch mechanism is disposed within the outer perimeters of the base and carrier when the carrier is connected to the base;
wherein the belt path is fixed in location on the base such that the carrier can be positioned in either the first, reclined position or the second, upright position without adjustment of the vehicle belt relative to the base.

2. The infant car seat according to claim 1, wherein the latch mechanism further comprises first and second latch receivers carried by the base corresponding to the first and second positions, respectively, and the carrier includes a latch for releasable engagement with the first and second latch receivers to position the carrier in the first position and the second position, respectively.

3. The infant car seat according to claim 1, wherein the base includes a fixed base portion and a movable base portion, the movable base portion being movable between the first position and the second position to move the carrier between the first position and the second position.

4. The infant car seat according to claim 1, further comprising a seat bottom portion and a seat back portion extending upward from the seat bottom portion, and a release handle mounted to the seat back portion and coupled to the latch to move the latch from a closed, latched position to an open, unlatched position.

5. An infant car seat, comprising:
a base, the base presenting an upwardly facing surface and an outer perimeter, the base including first and second latch receivers carried by the upwardly facing surface, the first and second latch receivers corresponding to a first latching position and a second latching position, respectively; and
a carrier coupled to the base, the carrier presenting a downwardly facing surface and an outer perimeter, the carrier including a latch carried by the downwardly facing surface, such that the latch and latch receivers disposed within the outer perimeters of the base and carrier when the carrier is connected to the base, wherein releasing the latch from the first and second latch receivers allows the carrier to move between the first and second latching positions and further allows the carrier to be removed from the base without disconnecting any additional attachments between the carrier and the base,
wherein the base includes a belt path along which a vehicle belt can be secured to the base, the belt path being fixed in location on the base such that the carrier can be moved between the first latching position and the second latching position without adjustment of the vehicle belt relative to the base.

6. The infant car seat according to claim 5, wherein the carrier is more reclined relative to the base in the first latching position than in the second latching position.

7. The infant car seat according to claim 5, wherein the infant car seat has a foremost point and a rearmost point relative to a forward direction of travel of the vehicle, and the distance between the foremost point and the rearmost point when the carrier is in the first latching position is equal to or less than the distance between the foremost point and the rearmost point when the carrier is in the second latching position.

8. The infant car seat according to claim 5, wherein, when the carrier is secured to the base, the carrier provides legroom measured along a horizontal plane from an upper rear edge of the carrier to a seat back of the vehicle seat, and the legroom is greater in the second latching position than in the first latching position.

9. The infant car seat according to claim 5, wherein the carrier includes a release handle coupled to the latch to move the latch from a closed, latched position to an open, unlatched position.

10. The infant car seat according to claim 9, wherein actuation of the release handle moves the latch linearly from the closed, latched position to the open, unlatched position.

11. The infant car seat according to claim 5, wherein the base includes a cover to cover one of the first and second latch receivers when not in use.

12. The infant car seat according to claim 4, wherein the first latch receiver comprises a first pair of bars located on opposite sides of an upper surface of the base, and the second latch receiver comprises a second pair of bars located on opposite sides of the upper surface of the base.

13. The infant car seat according to claim 12, wherein the latch comprises first and second latches on opposite sides of the carrier for releasable engagement with the first pair of bars and the second pair of bars, respectively, to position the carrier in the first latching position and in the second latching position, respectively.

14. The infant car seat according to claim 13, wherein the carrier includes a release handle coupled to the first and second latches to move the first and second latches from a closed, latched position to an open, unlatched position.

15. The infant car seat according to claim 14, wherein the release handle is slidably mounted to a lower surface of the carrier, and the release handle is coupled to the first and second latches by first and second connecting rods, respectively.

16. The infant car seat according to claim 15, wherein actuation of the release handle moves the first and second connecting rods and moves the first and second latches linearly from the closed, latched position to the open, unlatched position.

17. The infant car seat according to claim 12, wherein the carrier includes first and second covers movably mounted to opposite sides of the carrier to cover alternatively one of the first pair of bars and the second pair of bars, respectively, when not in use.

18. The infant car seat according to claim 5, further comprising a seat bottom portion and a seat back portion extending upward from the seat bottom portion, and a release handle mounted to the seat back portion and coupled to the latch to move the latch from a closed, latched position to an open, unlatched position.

19. The infant car seat according to claim 5, wherein the base defines an outer perimeter and the latch receivers are disposed within the outer perimeter of the base.

* * * * *

UNITED STATES PATENT AND TRADEMARK OFFICE
CERTIFICATE OF CORRECTION

| | |
|---|---|
| PATENT NO. | : 7,325,871 B2 |
| APPLICATION NO. | : 10/999147 |
| DATED | : February 5, 2008 |
| INVENTOR(S) | : Gangadharan et al. |

Page 1 of 1

It is certified that error appears in the above-identified patent and that said Letters Patent is hereby corrected as shown below:

On the Title Page, Item -56-

In the References Cited - Foreign Patent Documents

DE 202 15 837 - 12/2002 should be added.

Signed and Sealed this

Third Day of June, 2008

JON W. DUDAS
*Director of the United States Patent and Trademark Office*